US012617212B2

(12) United States Patent
Kawahara

(10) Patent No.: US 12,617,212 B2
(45) Date of Patent: May 5, 2026

(54) LIQUID DISCHARGE HEAD AND LIQUID DISCHARGE APPARATUS

(71) Applicant: Koji Kawahara, Tokyo (JP)

(72) Inventor: Koji Kawahara, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 235 days.

(21) Appl. No.: 18/531,701

(22) Filed: Dec. 7, 2023

(65) Prior Publication Data

US 2024/0190136 A1 Jun. 13, 2024

(30) Foreign Application Priority Data

Dec. 7, 2022 (JP) ................................ 2022-195276

(51) Int. Cl.
*B41J 2/175* (2006.01)
*B41J 2/14* (2006.01)
*B05B 1/30* (2006.01)

(52) U.S. Cl.
CPC ....... *B41J 2/17563* (2013.01); *B41J 2/14201* (2013.01); *B41J 2/17596* (2013.01); *B05B 1/3046* (2013.01)

(58) Field of Classification Search
CPC ................ B41J 2202/05; B41J 2202/12; B41J 2/14201; B41J 2/17596; B41J 2/04; B41J 2/14; B41J 2/18; B41J 2/285; B41J 2/17563; B41J 2002/14403; B05C 11/1034; B05C 5/0225; B05C 5/0237; B05B 1/3046; B05B 1/3013; B05B 1/304; B05B 12/14; B33Y 30/00; B22F 12/53; B22F 10/22; F02M 2200/46; F02M 61/18
See application file for complete search history.

(56) References Cited

U.S. PATENT DOCUMENTS 6,027,205 A * 2/2000 Herbert ...................... B41J 2/04 347/85
2006/0061640 A1* 3/2006 Doi ........................ C09D 11/30 347/100
2008/0056761 A1 3/2008 Kawahara et al.
2010/0170475 A1* 7/2010 Okumura ............. F02M 61/182 123/445
2013/0272743 A1 10/2013 Kawahara
2014/0212164 A1 7/2014 Miyagawa et al.
2018/0043381 A1 2/2018 Orla-Jensen et al.
(Continued)

FOREIGN PATENT DOCUMENTS

EP 2465682 A1 * 6/2012 ............. B41J 2/155
EP 2 561 932 A2 2/2013
(Continued)

OTHER PUBLICATIONS

Extended European Search Report issued Apr. 17, 2024 in European Patent Application No. 23214216.6, 8 pages.

*Primary Examiner* — John P Zimmermann
(74) *Attorney, Agent, or Firm* — XSENSUS LLP

(57) ABSTRACT

A liquid discharge head includes: a nozzle hole from which a liquid is dischargeable in a discharge direction; a channel communicating with the nozzle hole to supply the liquid to the nozzle hole; a needle valve movable in the discharge direction to openably close the nozzle hole; a driver to move the needle valve in the discharge direction; and a guide to guide the liquid in the channel toward the nozzle hole.

20 Claims, 13 Drawing Sheets

(56) References Cited

U.S. PATENT DOCUMENTS

| | | | |
|---|---|---|---|
| 2019/0240978 | A1 | 8/2019 | Kawahara et al. |
| 2019/0337005 | A1 | 11/2019 | Fritz et al. |
| 2020/0039217 | A1 * | 2/2020 | Kaiba ...................... B41J 2/135 |
| 2020/0276818 | A1 | 9/2020 | Odaka et al. |
| 2022/0106934 | A1 * | 4/2022 | Katou ................ F02M 61/1813 |
| 2022/0176451 | A1 * | 6/2022 | Schweizer .............. B22F 3/115 |
| 2022/0184967 | A1 | 6/2022 | Hiraga |
| 2022/0379609 | A1 * | 12/2022 | Matsufuji ............ B41J 2/14201 |
| 2023/0338977 | A1 * | 10/2023 | Egawa .................. B05B 1/3046 |

FOREIGN PATENT DOCUMENTS

| | | | |
|---|---|---|---|
| EP | 3 272 669 | A1 | 1/2018 |
| JP | S56-133174 | A | 10/1981 |
| JP | 2005-349843 | A | 12/2005 |
| JP | 2022-094924 | A | 6/2022 |
| JP | 2023-149920 | A | 10/2023 |
| WO | 2017/025830 | A1 | 2/2017 |

* cited by examiner

FIG. 13

| CIRCULATION FLOW RATE [ml/min] | | PARTICLE CONCENTRATION [wt%] | | |
|---|---|---|---|---|
| | | 0 - 25 | 25 - 50 | 50 - 75 |
| PARTICLE DENSITY [g/cm$^3$] | 0 - 2 | 20 | 40 | 80 |
| | 2 - 4 | 40 | 80 | 160 |
| | 4 - 6 | 80 | 160 | 300 |

LIQUID DISCHARGE HEAD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-195276, filed on Dec. 7, 2022, in the Japan Patent Office, the entire disclosure of which is hereby incorporated by reference herein.

BACKGROUND

Technical Field

The present embodiment relates to a liquid discharge head and a liquid discharge apparatus.

Description of the Related Art

A liquid discharge apparatus includes: a liquid discharger including a plurality of liquid discharge ports that discharges liquid, a plurality of valves corresponding to the liquid discharge ports, and a plurality of drivers that drives the valves to open and close the liquid discharge ports: a liquid supply unit that supplies liquid under pressure to the liquid discharge body; and a control unit that controls the voltage to be applied to the drivers in accordance with the number of valves to be simultaneously driven among the plurality of valves. The liquid discharge apparatus can be used for discharging an inkjet ink, a surface treatment liquid, a liquid for forming components of an electronic element or a light-emitting element or for forming an electronic circuit resist pattern, a material liquid for three-dimensional fabrication, or the like.

An inkjet printer includes: an ink tank that stores the ink to be supplied to each head unit: a circulation forward path that serves as a channel in which the ink to be supplied to each head unit circulates; and a circulation return path that serves as a channel in which the ink ejected from each head unit circulates. The inkjet printer can perform purging by using an ink.

SUMMARY

According to an aspect of the present disclosure, a liquid discharge head includes: a nozzle hole from which a liquid is dischargeable in a discharge direction: a channel communicating with the nozzle hole to supply the liquid to the nozzle hole: a needle valve movable in the discharge direction to openably close the nozzle hole; a driver to move the needle valve in the discharge direction; and a guide to guide the liquid in the channel toward the nozzle hole.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 13 is a conceptual diagram illustrating an example of a circulation flow rate information management table:

Figure 1:
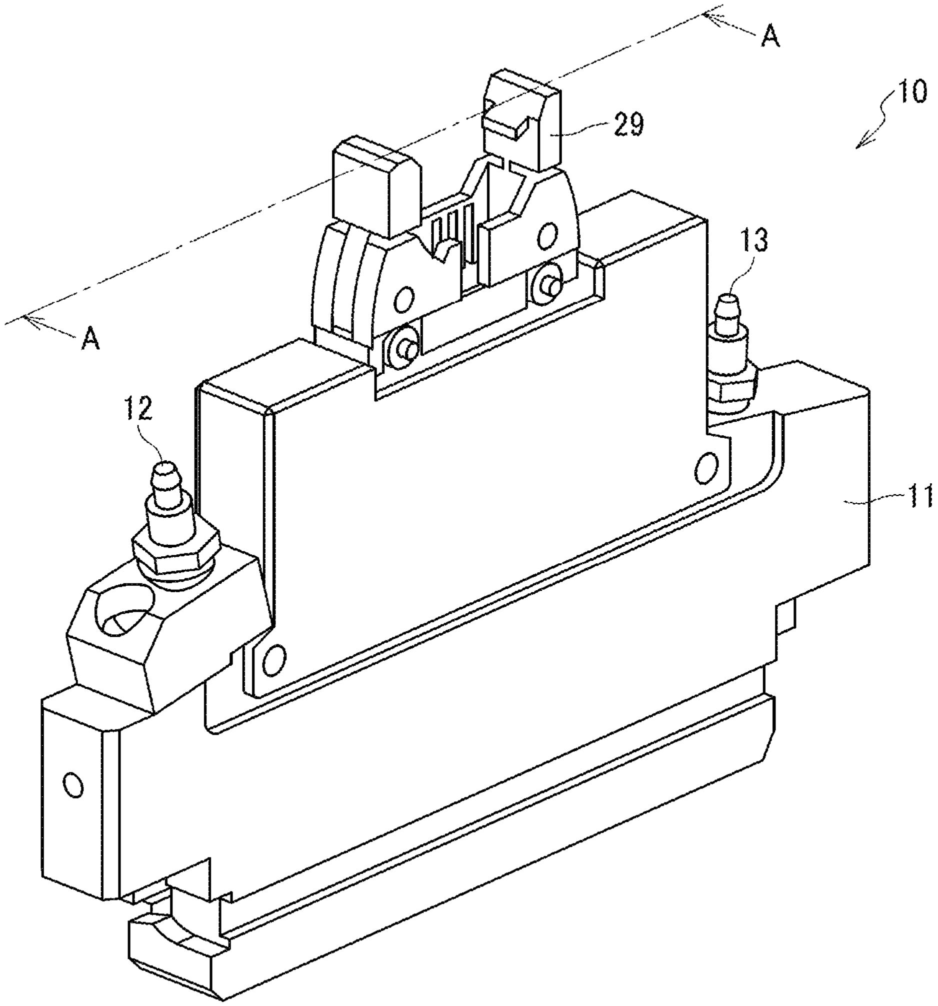
FIG. 1 is an overall perspective view of a liquid discharge head.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms “a”, “an” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Any one of the above-described operations may be performed in various other ways, for example, in an order different from the one described above. The methods described above can be provided as program codes stored in a recording medium, to cause a processor to execute the method when executed by at least one processor.

The following is a description of modes for carrying out embodiments of the invention, with reference to the accompanying drawings. As for the description of the drawings, the same components are denoted by the same reference signs, and explanation thereof will not be repeated. Note that the embodiments described below are not limiting the present disclosure, and any deletion, addition, modification, change, and the like can be made within a scope in which a person skilled in the art can conceive including other embodiments, any of which is included within the scope of the present disclosure as long as the effects of the present disclosure can be achieved.

Overview of a Liquid Discharge Head

First, an outline of a liquid discharge head is described with reference to FIGS. 1 to 4.

FIG. 1 is a perspective view of an entire liquid discharge head.

This liquid discharge head discharges ink as liquid. A liquid discharge head 10 has a housing 11. The housing 11 is formed with a metal or resin. The housing 11 has a connector 29 to communicate electrical signals at its upper portion. The housing 11 also has a supply port 12 and a collection port 13 at the left and right sides. The supply port 12 supplies ink to the inside of the liquid discharge head 10. The collection port 13 ejects ink from the liquid discharge head 10.

Figure 2:
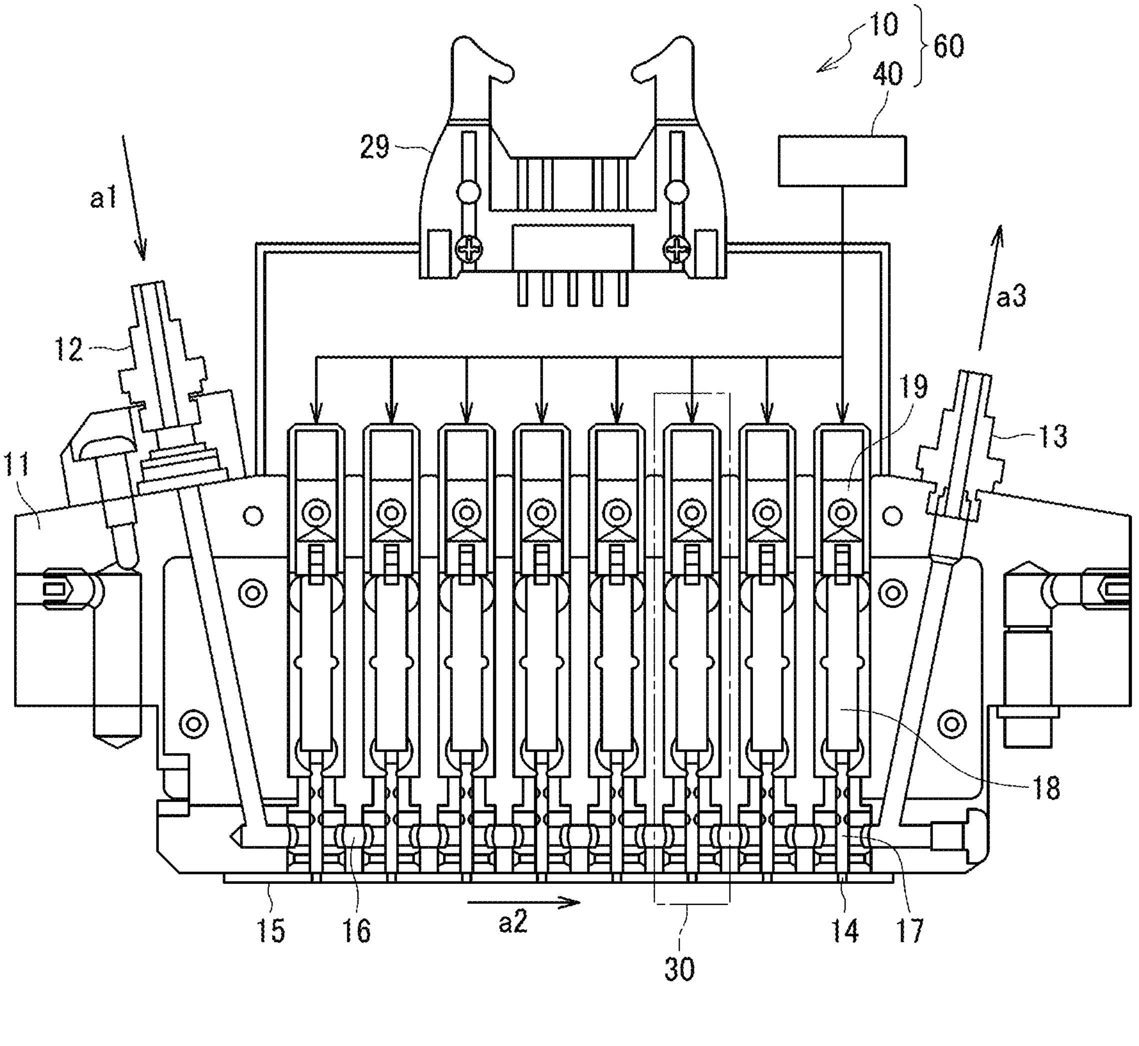
FIG. 2 is an internal configuration diagram of a head unit.

FIG. 2 is an internal configuration diagram of a head unit.

A head unit 60 includes the liquid discharge head 10 and a drive control device 40. The portion of the liquid discharge head 10 excluding the drive control device 40 is also a diagram illustrating a cross-section taken along the line A-A defined in FIG. 1.

The liquid discharge head 10 includes a nozzle plate 15. The nozzle plate 15 is joined to the housing 11. The nozzle plate 15 has a plurality of nozzle holes 14 for discharging ink. The plurality of nozzle holes 14 corresponds to a plurality of liquid discharge modules 30) to be described later.

The housing 11 has a channel 16 common to the plurality of liquid discharge modules 30 to be described later. The channel 16 is a path for sending ink from the supply port 12 to the collection port 13 via the nozzle plate 15. The ink is sent in the directions indicated by arrows a1, a2, and a3 in the channel 16.

A plurality of liquid discharge modules 30 is disposed between the supply port 12 and the collection port 13. The liquid discharge modules 30 discharge the ink in the channel 16 from the nozzle holes 14.

The number of the liquid discharge modules 30 corresponds to the number of the nozzle holes 14, and this example concerns a configuration including eight liquid discharge modules 30 corresponding to eight nozzle holes 14 arranged in one row: The number and the arrangement of the nozzle holes 14, and the number and the arrangement of the liquid discharge modules 30) are not limited to the numbers and the arrangements described above. For example, the number of the nozzle holes 14 and the number of the liquid discharge modules 30 may be one, instead of a plural number. Further, the nozzle holes 14 and the liquid discharge modules 30 may be arranged in a plurality of rows, instead of one row.

With the above configuration, the supply port 12 takes in the ink in a pressurized state from an outside, feeds the ink in the direction indicated by the arrow a1, and supplies the ink to the channel 16. The channel 16 feeds the ink from the supply port 12 to the collection port 13 in the direction indicated by the arrow a2. The collection port 13 then ejects the ink that has not been discharged from the nozzle holes 14 in the direction indicated by the arrow a3. The nozzle holes 14 are arranged along the channel 16.

Each liquid discharge module 30 includes a needle valve 17 that opens and closes the nozzle hole 14, and a piezoelectric element 18 as a driver that drives the needle valve 17. The piezoelectric element 18 can perform driving through voltage application. The piezoelectric element 18 applies voltage to the needle valve 17 to move the needle valve 17 upward and open the nozzle hole 14, for example. The piezoelectric element 18 stops the voltage application (or applies a closing voltage) to move the needle valve 17 downward and close the nozzle hole 14.

The housing 11 includes a regulator 19 at a position facing the upper end of each piezoelectric element 18. This regulator 19 is in contact with the upper end of each piezoelectric element 18, and serves as a securing point for each piezoelectric element 18.

Figure 3:
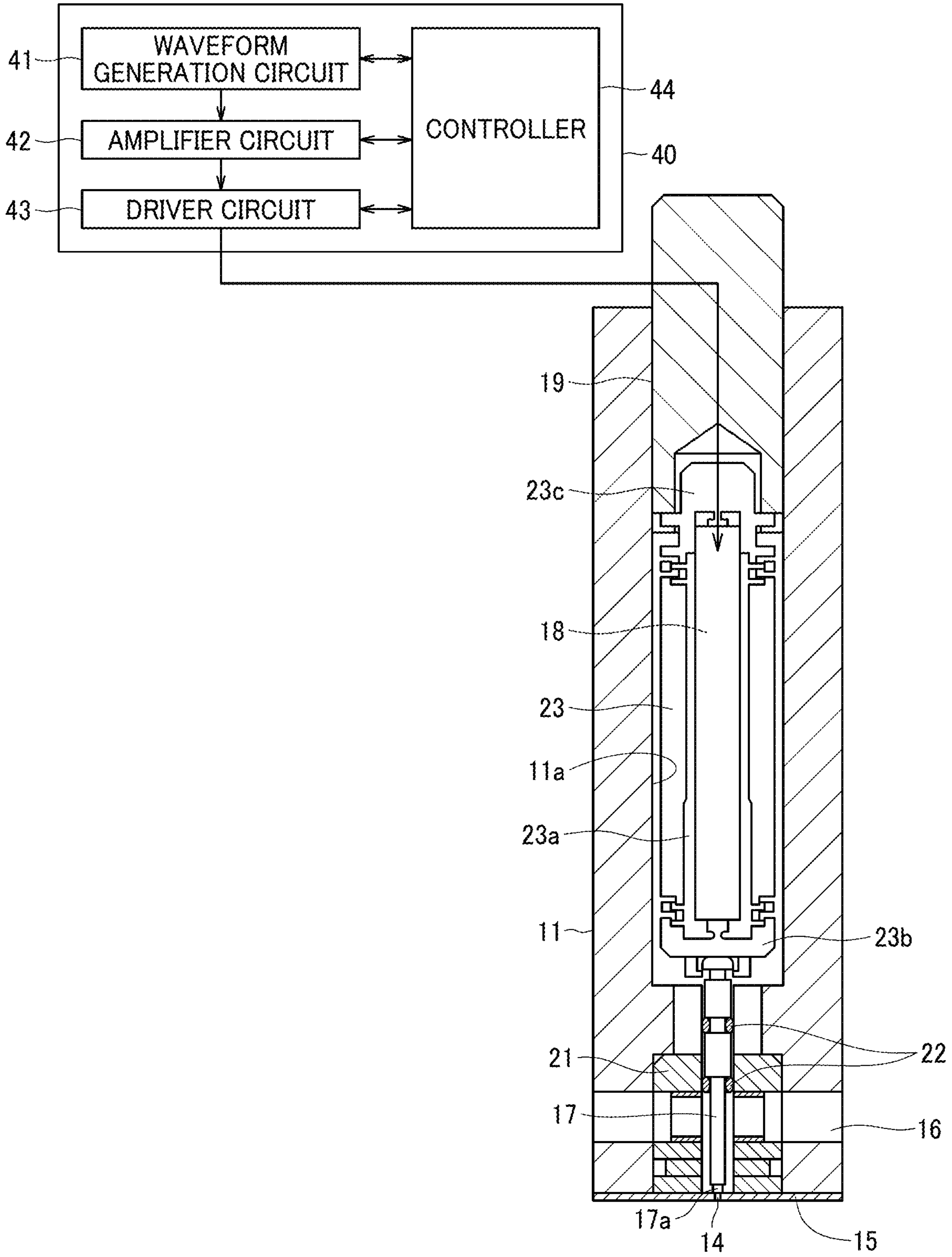
FIG. 3 is an explanatory view of a single liquid discharge module.

FIG. 3 is an explanatory diagram of a single liquid discharge module.

The needle valve 17 has an elastic body 17*a* formed with an elastic material such as fluororesin at its top edge. When the top edge of the needle valve 17 is pressed against the nozzle plate 15, the elastic body 17*a* is compressed, so that the needle valve 17 reliably closes the nozzle hole 14. A bearing portion 21 is provided between the needle valve 17 and the housing 11. A sealing member 22 such as an O-ring is provided between the bearing portion 21 and the needle valve 17. The piezoelectric element 18 is accommodated in a space 11*a* inside the housing 11. A holding member 23 holds the piezoelectric element 18 in a central space 23*a*.

The piezoelectric element 18 and the needle valve 17 are coupled via a tip portion 23*b* of the holding member 23, which is coaxial with the piezoelectric element 18 and the needle valve 17. The tip portion 23*b* of the holding member 23 is coupled to the needle valve 17, and a rear and portion 23*c* of the holding member 23 is secured by the regulator 19 attached to the housing 11.

When the drive control device 40 applies voltage to the piezoelectric element 18, the piezoelectric element 18 contracts, and pulls the needle valve 17 via the holding member 23. As a result, the needle valve 17 is separated from the nozzle plate 15 in the vicinity of the nozzle hole 14, to open the nozzle hole 14. Thus, the ink pressurized and supplied into the channel 16 is discharged through the nozzle hole 14. When no voltage is applied to the piezoelectric element 18 (or when a closing voltage is applied), the needle valve 17 closes the nozzle hole 14. In this state, even if ink is pressurized and supplied into the channel 16, the ink is not discharged through the nozzle hole 14. The elastic body 17*a* of the needle valve 17 changes the voltage to be applied to the piezoelectric element 18, to separate and move between a position at a distance from the nozzle plate 15 and a position in contact with the nozzle plate 15.

The drive control device 40 includes a waveform generation circuit 41 that is a drive pulse generation unit, an amplifier circuit 42, a driver circuit 43, and a controller 44. The waveform generation circuit 41 generates a drive pulse waveform to be described later, and the amplifier circuit 42 amplifies the voltage value to a necessary value. The amplified voltage is then applied to the piezoelectric element 18 through the driver circuit 43. By this voltage application, the drive control device 40 controls opening and closing of the needle valve 17, and controls discharge of ink from the liquid discharge head 10.

In a case where the waveform generation circuit 41 can apply a voltage of a sufficient value, the amplifier circuit 42 is not necessarily included.

The waveform generation circuit 41 generates a drive pulse that is the waveform of the voltage to be applied to the piezoelectric element 18, and changes over time. The waveform generation circuit 41 receives an input of print data from an external terminal device or a microcomputer in the apparatus, and generates a drive pulse based on this input data. The waveform generation circuit 41 can change the voltage to be applied to the piezoelectric element 18, and generate multiple drive pulses. As described above, the waveform generation circuit 41 generates a drive pulse so that the piezoelectric element 18 expands and contracts in accordance with the drive pulse, to open and close the needle valve 17.

Figure 4:
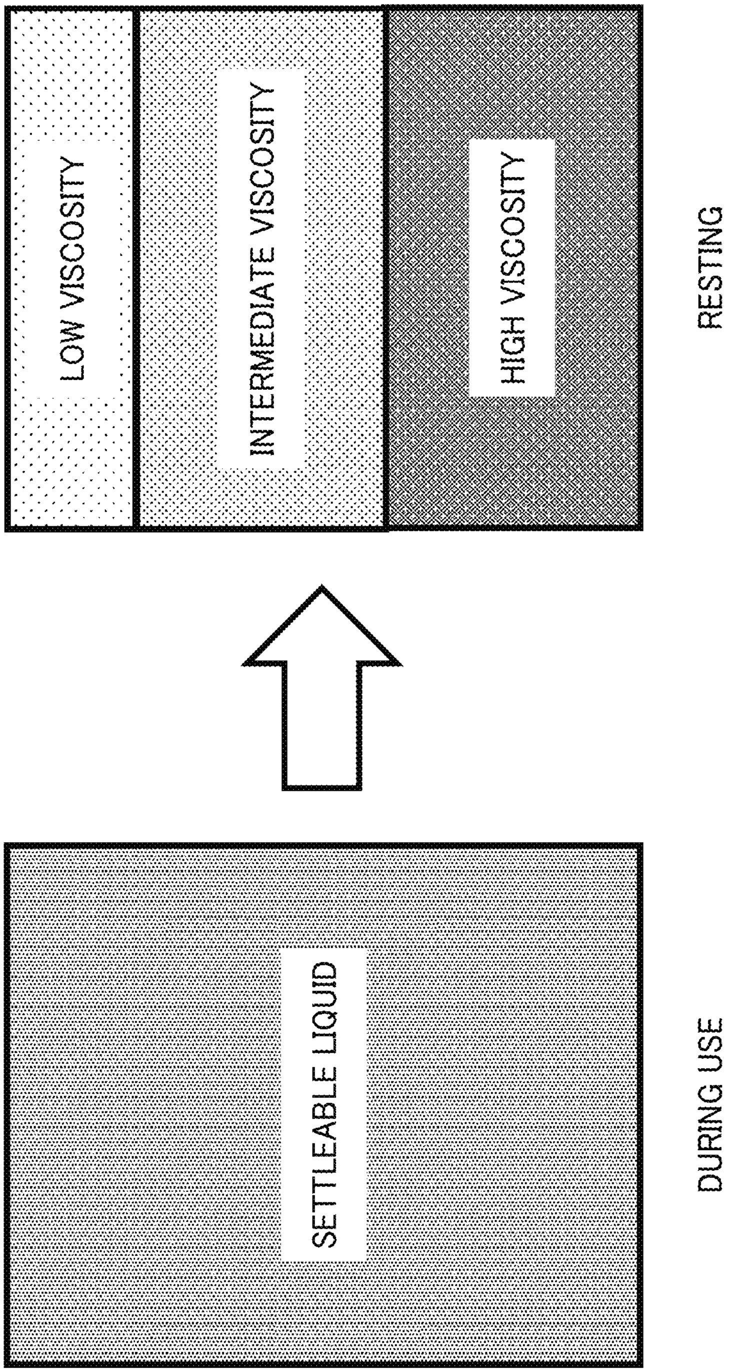
FIG. 4 is an explanatory diagram of a settleable liquid.

FIG. 4 is an explanatory diagram of a settleable liquid.

A solvent that imparts pseudoplasticity in accordance with the purpose of use can be added to a liquid such as the ink or paint flowing in the channel 16 of the liquid discharge head 10. There are various kinds of solvents, and, for example, a solvent having an average molecular weight of 7000 to 8000, such as polyethylene glycol, can be added. In this case, pseudoplasticity is developed in the liquid when about 30 vol % or more of the solvent is added. This pseudoplasticity increases with the solvent addition ratio. Since the appropriate viscosity range at the time of use varies depending on the liquid to be used, the amount of the solvent to be added is adjusted depending on the liquid to be used.

It is known that, if discharge from the liquid discharge head 10 is stopped when a liquid exhibiting pseudoplasticity as described above or a settleable liquid is used, particles having high viscosity in the settleable liquid or the like settle in the channel 16 as illustrated in FIG. 4, and condensation and rarefaction are caused by the particle settling. Examples of the settleable liquid include titanium oxide contained in white ink, and red iron oxide contained in the red ink.

The particles settled in this manner generate a coarse state and a dense state of the liquid in the channel 16, and make the discharge state unstable at the time of re-ejection of the liquid.

Therefore, the present embodiment includes a guide that guides the liquid passing through the channel 16 to the nozzle holes 14, so that stable discharging performance can be maintained even with a liquid having pseudoplasticity or settleability.

First Embodiment

Figure 5A:
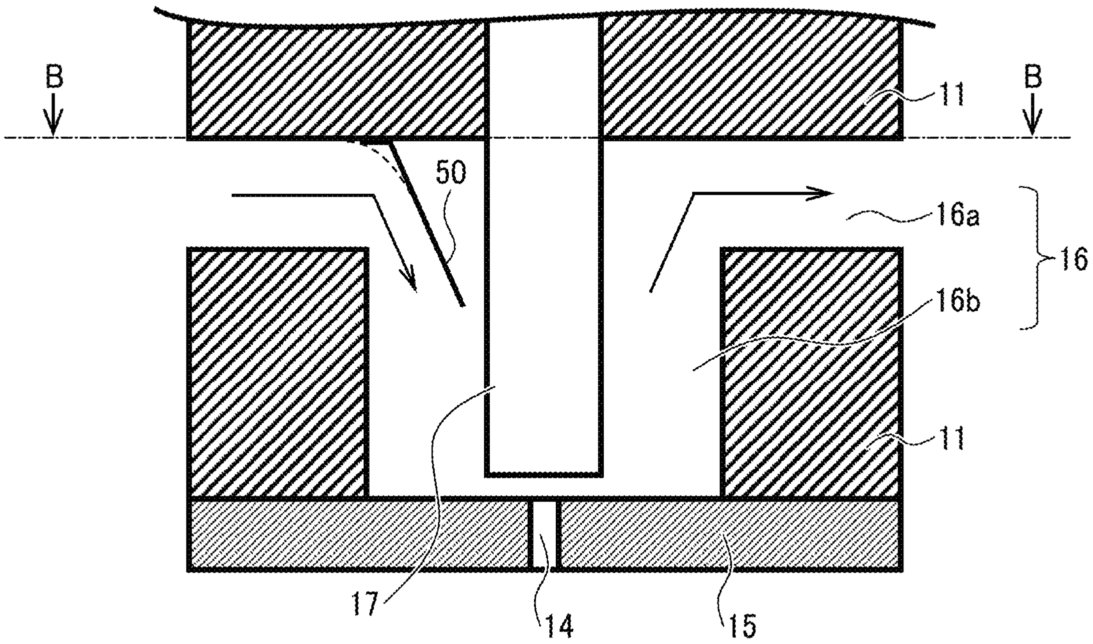
FIGS. 5A and 5B are explanatory views illustrating a first embodiment.
Figure 5B:
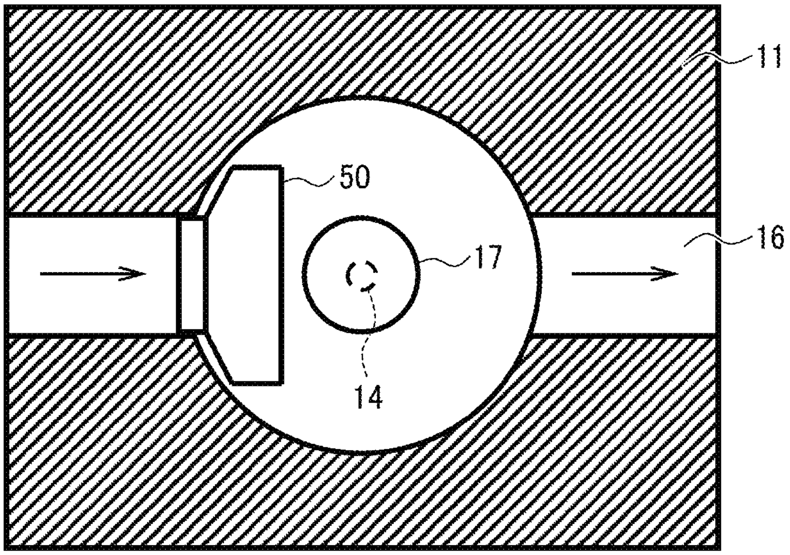

FIGS. 5A and 5B are explanatory views illustrating a first embodiment: FIG. 5A is a schematic cross-sectional view of the needle valve tip portion in a single liquid discharge module, and FIG. 5B is a cross-sectional view taken along the line B-B defined in FIG. 5A.

In FIG. 5, a nozzle plate 15 having a nozzle hole 14 is joined to a housing 11. Also, a channel 16 through which liquid passes is formed in the housing 11. The channel 16 includes a common chamber 16*a* that sends liquid from the left side to the right side of the housing 11, and an individual chamber 16*b* that is formed between the common chamber 16*a* and the nozzle hole 14, and is one step deeper.

A needle valve 17 moves away from and comes into contact with the nozzle hole 14 in the channel 16, and opens the nozzle hole 14 when located at a position separated from the nozzle plate 15 as illustrated in the drawing. That is, the channel 16 and the nozzle hole 14 communicate with each other. With this arrangement, the liquid supplied into the individual chamber 16*b* is discharged through the nozzle hole 14. When the needle valve 17 is at a position in contact with the nozzle plate 15, the needle valve 17 closes the nozzle hole 14, so that the liquid supplied into the individual chamber 16*b* is not discharged through the nozzle hole 14. Here, the common chamber 16*a* is an example of a first liquid chamber, and the individual chamber 16*b* is an example of a second liquid chamber.

Further, a directional member 50) that guides the liquid flowing in the channel 16 (the common chamber 16*a*) toward the nozzle hole 14 is secured to the inner wall of the common chamber 16*a* (the upper surface of the common chamber 16*a* in this example). The directional member 50 is a plate-like member designed to guide the liquid supplied into the common chamber 16*a* toward the individual chamber 16*b*, and is secured to the common chamber 16*a* by a known securing method such as adhesion or screwing. The material of the directional member 50 is not limited to any particular material, but is preferably a stainless material in a case where the liquid to be used is a liquid containing a solvent. Here, the directional member 50 is an example of the guide.

As described above, the present embodiment is the liquid discharge head 10 including the channel 16 through which the liquid passes, the nozzle hole 14 that communicates with the channel 16 and discharges the liquid, the needle valve 17 that moves away and comes into contact with the nozzle hole 14 to open and close the nozzle hole 14, and the piezoelectric element 18 that moves the needle valve 17 to and from the nozzle hole 14. The liquid discharge head 10 further includes the directional member 50 that guides the liquid flowing in the channel 16 toward the nozzle hole 14.

As described above, the channel 16 includes the common chamber 16*a* through which the liquid passes, and the individual chamber 16*b* formed between the common chamber 16*a* and the nozzle hole 14. The directional member 50 guides the liquid from the common chamber 16*a* toward the individual chamber 16*b*.

With this arrangement, the liquid flow in the common chamber 16*a* is transmitted to the inside of the individual chamber 16*b* by the directional member 50, and a liquid flow is generated even around the tip portion of the needle valve 17 and the nozzle hole 14. As a result, in a case where a liquid having pseudoplasticity or settleability is used, particle settling or the like is less likely to occur around the tip portion of the needle valve 17 and the nozzle hole 14, and degradation in discharging performance can be reduced.

The directional member 50 may have a curved cross-sectional shape as indicated by a dashed line in FIG. 5A. The curved cross-sectional shape can lower channel resistance.

Further, the inclination angle of the directional member 50 with respect to the inner wall (the upper wall surface in the drawing) of the common chamber 16*a* to which the directional member 50 is attached may be appropriately adjusted depending on the viscosity or pseudoplasticity of the liquid to be discharged by the liquid discharge head 10.

In a case where a liquid discharge head 10 including a plurality of nozzle holes 14 is formed by coupling the respective common chambers 16*a* of a plurality of liquid discharge modules 30 in series as illustrated in FIG. 2, the inclination angle of the directional member 50 may differ with each liquid discharge module 30.

Figure 6A:
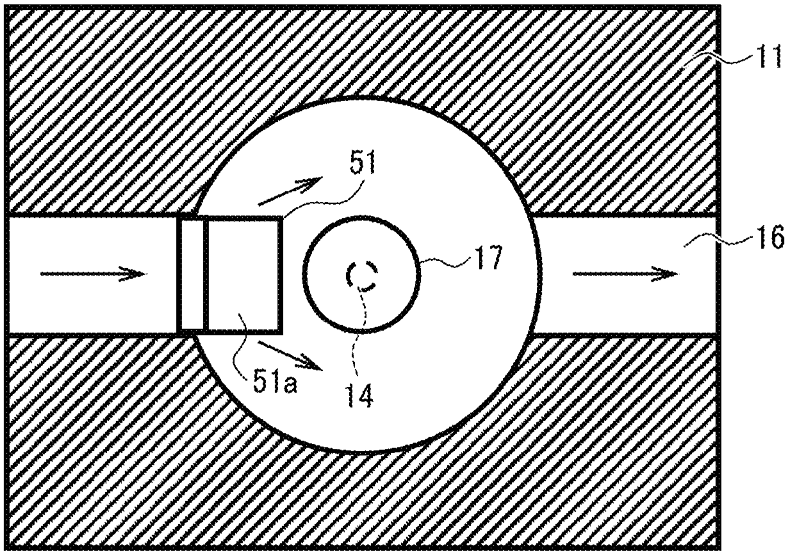
FIGS. 6A and 6B are explanatory views each illustrating a modification of the first embodiment.
Figure 6B:
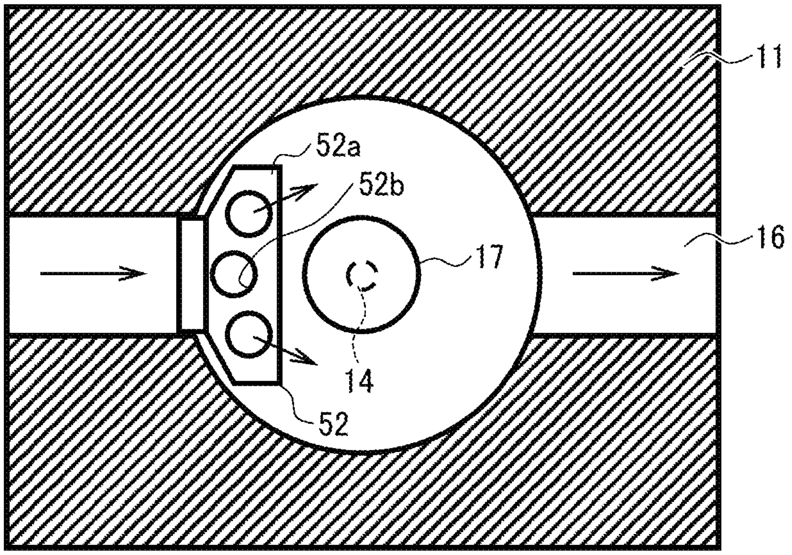

The flow rate, which is the velocity of the liquid flowing in the common chambers 16*a*, drops as the liquid moves away from the supply port 12 and comes closer to the collection port 13. Accordingly, the velocity of the liquid flowing in the channel 16 of a liquid discharge module 30 close to the supply port 12 is high, and the velocity of the liquid flowing in the channel 16 of a liquid discharge module 30 close to the collection port 13 is low: When the velocity at which the liquid flows in a channel 16 becomes lower, the velocity at which the liquid is guided from the common chamber 16*a* to the individual chamber 16*b* by the directional member 50) also becomes lower. Therefore, the inclination angle of the directional member 50 of a liquid discharge module 30 close to the collection port 13 may be made larger than the inclination angle of the directional member 50 of a liquid discharge module 30 close to the supply port 12. As a result, even in a liquid discharge module 30 close to the collection port 13 at which the flow rate of the liquid is lower, the liquid in the individual chamber 16*b* can sufficiently flow:

FIGS. 6A and 6B are explanatory views illustrating modifications of the first embodiment, and are cross-sectional views corresponding to FIG. 5B.

The directional member 50 illustrated in FIGS. 5A and 5B is designed to guide most of the liquid supplied into the common chamber 16*a* toward the individual chamber 16*b*. However, the directional member may be designed to distribute the liquid to the individual chamber and the downstream side of the common chamber as illustrated in FIGS. 6A and 6B.

A directional member 51 in FIG. 6A differs from the directional member 50 in FIGS. 5A and 5B in having a guide portion 51*a* that has a short length in a direction intersecting the channel 16. With this arrangement, while guiding the liquid toward the individual chamber 16*b*, the guide portion 51*a* can release the liquid from both end portions of the guide portion 51*a* (the upper side and the lower side of the guide portion 51*a* in FIG. 6A). As a result, it becomes possible to achieve both circulation of the liquid to the individual chamber 16*b* and ease of flow of the liquid to the downstream side of the common chamber 16*a*. Here, the directional member 51 is an example of the guide, the guide portion 51*a* is an example of a guide portion, and both end portions of the guide portion 51*a* (the upper side and the lower side of the guide portion 51*a* in FIG. 6A) are an example of a bypass portion.

A directional member 52 in FIG. 6B differs from the directional member 50 in FIGS. 5A and 5B in that an opening 52*b* is formed in a direction intersecting the channel 16. With this arrangement, a guide portion 52*a* can release the liquid through the opening 52*b* while guiding the liquid toward the individual chamber 16*b*. As a result, it becomes possible to achieve both circulation to the individual chamber 16*b* and ease of flow of the liquid to the downstream side of the common chamber 16*a*. Here, the directional member 52 is an example of the guide, the guide portion 52*a* is an example of the guide portion, and the opening 52*b* is an example of the bypass portion.

As described above, in the present embodiment, the directional members 51 and 52 have the guide portions 51*a* and 52*a* that guide the liquid toward the individual chamber 16*b*, and the bypass portions (both end portions of the guide portion 51*a*, and the opening 52*b*) that guide the liquid to the downstream side of the common chamber 16*a*.

Thus, in a case where a high-viscosity liquid having pseudoplasticity or settleability is used, it is possible to achieve both circulation to the individual chamber and ease of flow of the liquid to the downstream side of the common chamber.

In the liquid discharge head 10 including the plurality of liquid discharge modules 30 as illustrated in FIG. 2, the bypass portion (both end portions of the guide portion 51*a*, or the opening 52*b*) may differ with each liquid discharge module 30.

For example, in a liquid discharge module 30 close to the supply port 12 having a high liquid flow rate, the width of both end portions of the guide portion 51*a* or the width of the opening 52*b* is made greater to increase the flow rate of the liquid flowing through the bypass portion. In a liquid discharge module 30 close to the collection port 13 having a low liquid flow rate, on the other hand, the width of both end portions of the guide portion 51*a* or the opening 52*b* is made smaller to increase the flow rate of the liquid flowing into the individual chamber 16*b*. With this arrangement, in a liquid discharge module 30 close to the collection port 13, the liquid in the individual chamber 16*b* flows efficiently, so that particle settling and an increase in the viscosity of the liquid can be reduced.

Figure 7A:
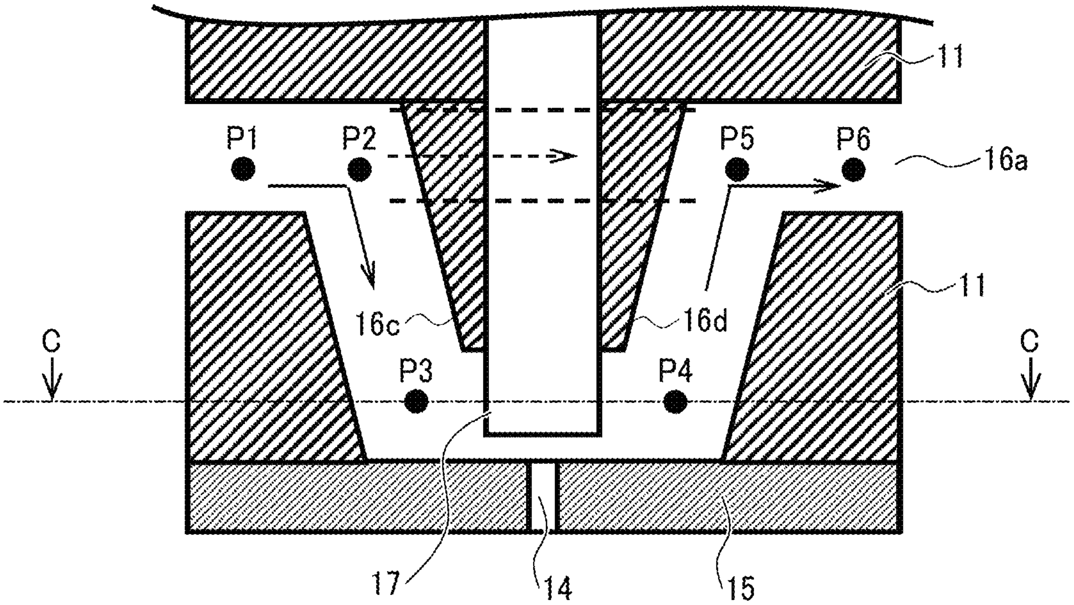
FIGS. 7A and 7B are explanatory views illustrating a modification of the first embodiment.
Figure 7B:
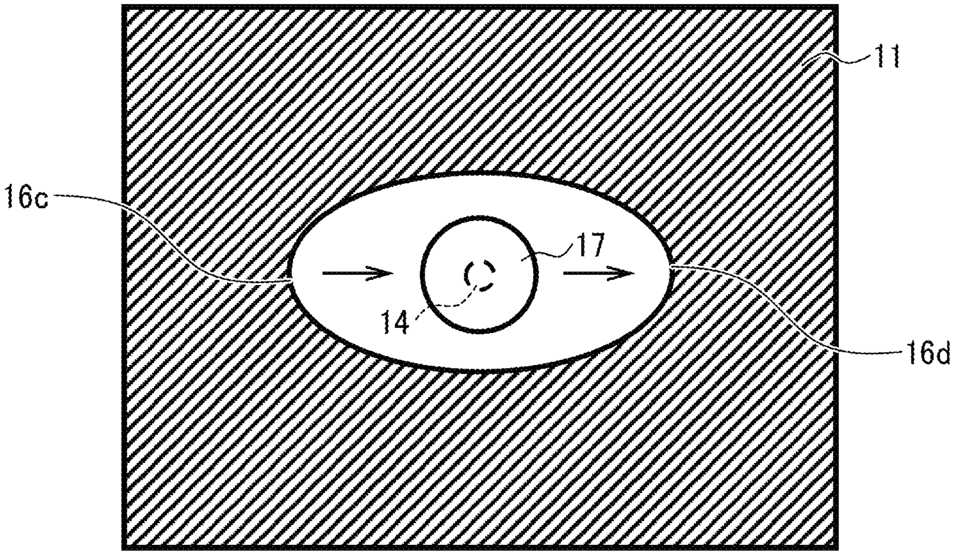

FIGS. 7A and 7B are also explanatory views illustrating a modification of the first embodiment. FIG. 7A is a schematic cross-sectional view of a needle valve tip portion in a single liquid discharge module, and FIG. 7B is a cross-sectional view taken along the line C-C defined in FIG. 7A.

The configuration illustrated in FIGS. 7A and 7B differs from the configuration illustrated in FIG. 5 in the shape of the channel in the housing 11. In the configuration in FIGS. 7A and 7B, channels 16*c* and 16*d* having a shape designed to guide liquid toward the nozzle hole 14 and then guide the liquid in a direction away from the nozzle hole 14 is formed in the housing 11. In this case, the channel includes to the common chamber 16*a* and the channels 16*c* and 16*d* serving as the individual chamber 16*b* in FIG. 5A. The channels 16*c* and 16*d* regulate the flow of the liquid, without any directional member guiding the liquid as illustrated in FIGS. 5A to 6B. Thus, the flow can be efficiently transmitted. The channels 16*c* and 16*d* in this case is an example of the guide.

The shape of the channels 16*c* and 16*d*, which is the shape obtained by sequentially joining points P1 to P6 illustrated in FIG. 7A, is not limited to a rectangular shape as illustrated in the drawing. For example, the shape obtained by sequentially joining the points P1 to P6 may be turned into a V- or U-shape. Further, a bypass indicated by a dashed line may be formed in the housing 11, to achieve both circulation of the liquid to the side of the nozzle hole 14 and ease of flow of the liquid to the downstream side of the channels 16*c* and 16*d*.

As described above, in the present embodiment, the channels 16*c* and 16*d* are channels formed in a shape designed to guide the liquid toward the nozzle hole 14 and then guide the liquid in a direction away from the nozzle hole 14.

With this arrangement, a stable liquid flow is generated around the nozzle hole 14, and, in a case where a liquid having pseudoplasticity or settleability is used, particle settling or the like is less likely to occur around the tip portion of the needle valve 17 and the nozzle hole 14. Thus, degradation in discharging performance can be reduced.

Further, in the embodiment illustrated in FIG. 5A, the directional member 50 is formed with a plate-like member such as a plate. Therefore, a stagnation portion in which the flow of the liquid becomes slower appears in the downstream part (the upper right portion in the drawing) of the liquid flow caused by the directional member 50. In such a stagnation portion, the liquid flows slowly. Therefore, settling of sediments, an increase in liquid viscosity; and the like are likely to occur. In the modification illustrated in FIGS. 7A and 7B, on the other hand, any stagnation portion in which the flow of the liquid becomes slower does not appear. Thus, particle settling and an increase in liquid viscosity are further less likely to occur, and degradation in discharging performance can be reduced.

A case where the directional member 50 as the guide portion is not provided in FIGS. 5A and 5B is now described. In FIG. 5A, even in a case where the directional member 50) is not provided, when the needle valve 17 is separated from the nozzle plate 15 and is at a position to open the nozzle hole 14, the liquid flows from the common chamber 16*a* toward the nozzle hole 14. Thus, particle settling in the liquid hardly occurs. However, when the needle valve 17 comes into contact with the nozzle plate 15 and closes the nozzle hole 14, the liquid flows in the common chamber 16*a* without the directional member 50, and the liquid in the individual chamber 16*b* flows slowly. As a result, particle settling and an increase in liquid viscosity are likely to occur in the individual chamber 16*b*. When the needle valve 17 is separated from the nozzle plate 15 to open the nozzle hole 14 and discharge the liquid through the nozzle hole 14 in that situation, a discharge failure such as discharge bending or discharge stoppage occurs due to the influence of particle settling or an increase in viscosity in the individual chamber 16*b*. In a case where such a discharge failure occurs, it is necessary to discharge a predetermined amount of liquid through the nozzle hole 14 while the nozzle hole 14 is left open, to eject the liquid in which sediments and the viscosity have increased. This will cause a problem such as an increase in the amount of liquid consumption.

In the first embodiment, a guide such as the directional member 50 is provided in the channel 16. With this arrangement, even when the nozzle hole 14 is closed by the needle valve 17, the liquid flows in the individual chamber 16*b*, and particle settling and an increase in liquid viscosity do not occur. Accordingly, there is no degradation in discharging performance, and no need to discharge unnecessary liquid through the nozzle hole 14. Thus, the amount of liquid consumption can be reduced.

Second Embodiment

Figure 8:
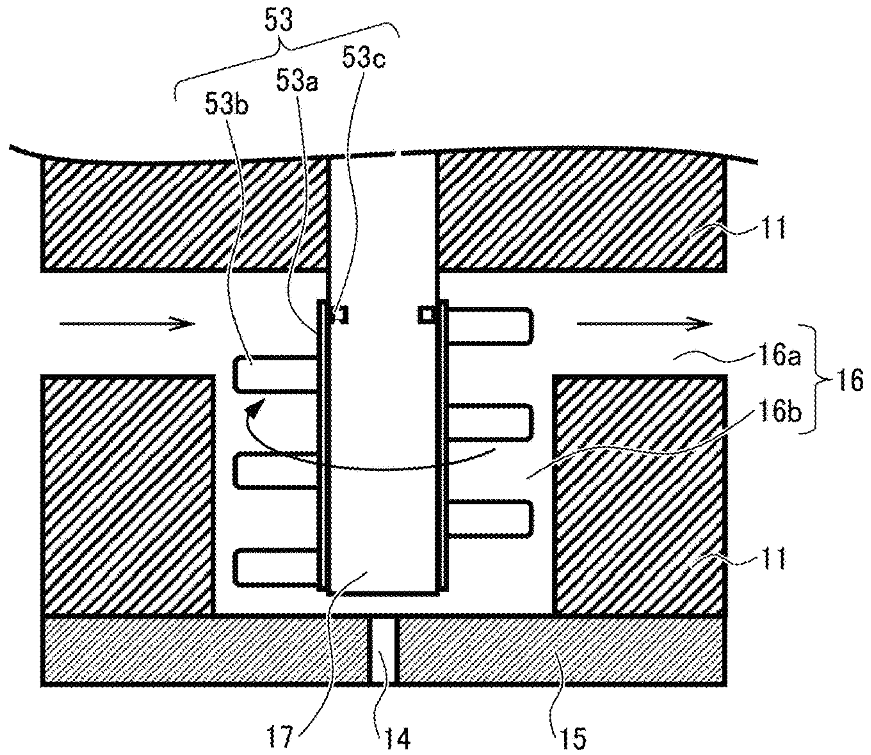
FIG. 8 is an explanatory view illustrating a second embodiment.

FIG. 8 is an explanatory view illustrating a second embodiment.

In the second embodiment, the liquid around the tip portion of the needle valve 17 and the nozzle hole 14 is stirred with a propeller mechanism 53.

The propeller mechanism 53 includes a cylindrical sleeve 53*a*, blades 53*b* provided on the outer circumferential portion of the sleeve 53*a*, and protrusions 53*c* provided on the inner circumferential portion of the sleeve 53*a*. The sleeve 53*a* is fitted to the outer periphery of the tip portion of the needle valve 17, and the protrusions 53*c* are engaged with holes formed in the outer periphery of the needle valve 17 (or a groove formed in the circumferential direction) of the needle valve 17, for example. Thus, the sleeve 53*a* is supported rotatably with respect to the needle valve 17.

The blades 53*b* are secured to the outer circumferential portion of the sleeve 53*a*, and rotate with respect to the needle valve 17 via the sleeve 53*a*. Here, the propeller mechanism 53 is an example of the guide, and the blades 53*b* are an example of a rotator. The sleeve 53*a*, the blades 53*b*, and the protrusions 53*c* may be integrally molded, or may be molded by joining individually provided members.

Further, the shape and the number of the blades 53*b* are not limited to the configuration illustrated in the drawing, but may be appropriately changed based on the force received from the liquid flowing in the channel 16, and the stirring properties, the fluidity, or the like of the liquid in the channel 16. The blade portion may be replaced with a spiral screw.

In the above configuration, the propeller mechanism 53 receives the liquid flowing in the common chamber 16*a* with the blades 53*b*, and rotates around the needle valve 17, to stir the liquid around the tip portion of the needle valve 17 and the nozzle hole 14.

As described above, in the present embodiment, the propeller mechanism 53 includes the blades 53*b* rotatably supported in the common chamber 16*a* as an example of the first liquid chamber and the individual chamber 16*b* as an example of the second liquid chamber. The blades 53*b* are rotated by the flowing force of the liquid.

With this arrangement, the liquid flowing in the common chamber 16*a* is guided to the individual chamber 16*b* by the propeller mechanism 53, and is circulated and stirred together with the liquid around the tip portion of the needle valve 17 and the nozzle hole 14. As a result, in a case where a liquid having pseudoplasticity or settleability is used, particle settling or the like is less likely to occur around the tip portion of the needle valve 17 and the nozzle hole 14, and degradation in discharging performance can be reduced.

Figure 9:
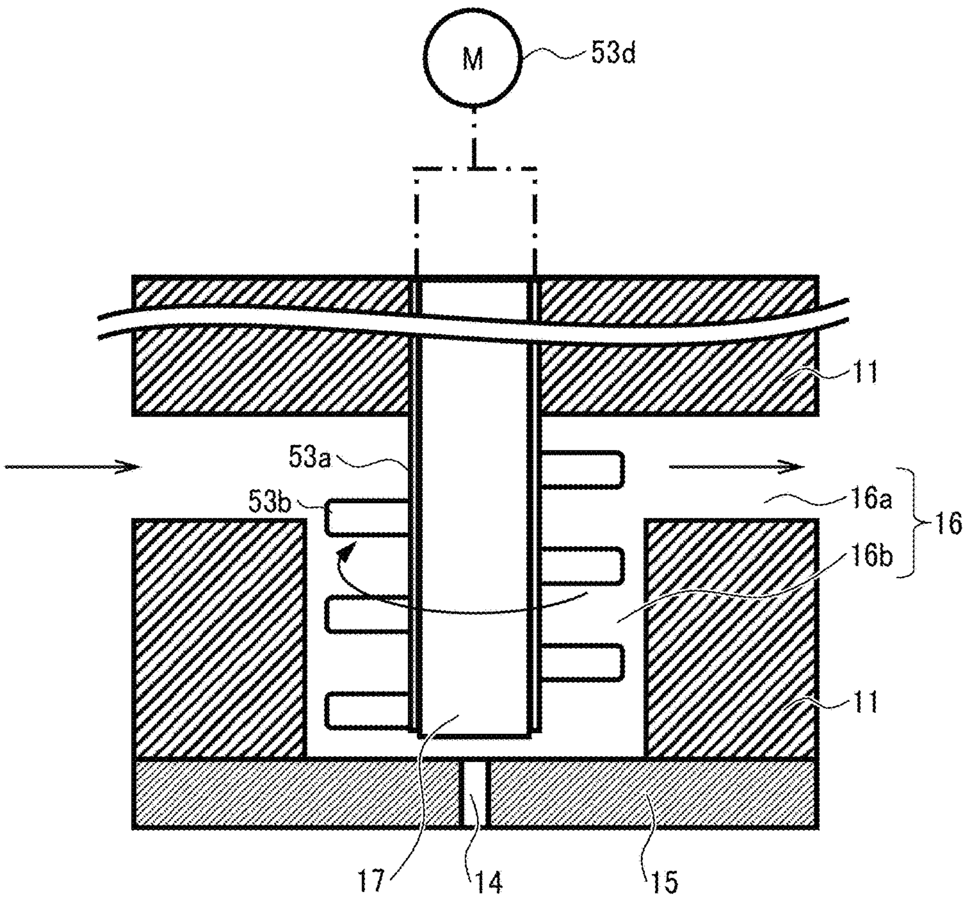
FIG. 9 is an explanatory view illustrating a modification of the second embodiment.

FIG. 9 is an explanatory view illustrating a modification of the second embodiment.

In the configuration illustrated in FIG. 8, the propeller mechanism 53 receives the liquid flowing in the common chamber 16*a* with the blades 53*b*, and rotates around the needle valve 17. However, the propeller mechanism 53 may include a drive source 53*d* for rotating the blades 53*b*, as in the present modification. The drive source 53*d* is a drive motor, for example, and the drive source 53*d* and the sleeve 53*a* are coupled so that power of the drive source 53*d* is transmitted to the sleeve 53*a*.

As the drive source 53*d* for rotating the blades 53*b* is provided, stirring of the liquid in the channel 16 can be independently continued even when the liquid circulation operation is stopped, for example. Accordingly, particle settling and the like around the tip portion of the needle valve 17 and the nozzle hole 14 can be made less likely to occur.

Further, in a case where the configuration of the present modification is applied to a liquid discharge head in which a plurality of liquid discharge modules 30 is disposed as illustrated in FIG. 2, each individual liquid discharge module 30 can stir the liquid in the channel 16. For example, in the liquid discharge head 10 illustrated in FIG. 2, when a large amount of liquid is consumed in the upstream portion, the flow of the liquid in the downstream portion becomes weaker, and settling easily occurs. In such a case, the blades 53*b* are rotationally driven in the liquid discharge module 30 disposed in the downstream portion. Thus, settling can be prevented.

Third Embodiment

Figure 10:
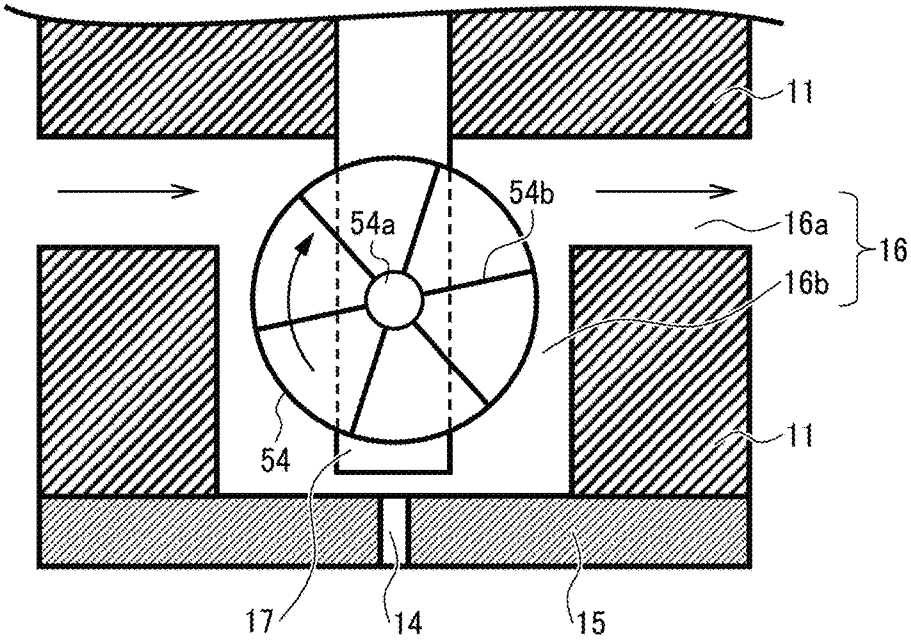
FIG. 10 is an explanatory view illustrating a third embodiment.

FIG. 10 is an explanatory view illustrating a third embodiment.

In the third embodiment, the liquid around the tip portion of the needle valve 17 and the nozzle hole 14 is stirred with a waterwheel mechanism 54.

The waterwheel mechanism 54 includes a rotating shaft 54*a* and blades 54*b*. The rotating shaft 54*a* is secured to the tip portion of the needle valve 17, so that the waterwheel mechanism 54 is supported rotatably with respect to the needle valve 17. The rotating shaft 54*a* may be secured to the inner surface of the housing 11 facing the needle valve 17.

The blades 54*b* are formed to extend in the radial direction from the outer circumferential portion of the rotating shaft 54*a*, for example.

Here, the waterwheel mechanism 54 is an example of the guide, and the blades 54*b* are an example of the rotator. The shape and the number of the blades 54*b* are not limited to the configuration illustrated in the drawing, but may be appropriately changed based on the force received from the liquid flowing in the channel 16, and the stirring properties, the fluidity; or the like of the liquid in the channel 16.

In the above configuration, the waterwheel mechanism 54 rotates when receiving the liquid flowing in the common chamber 16*a* with the blades 54*b*, and stirs the liquid around the tip portion of the needle valve 17 and the nozzle hole 14.

As described above, in the present embodiment, the waterwheel mechanism 54 includes the blades 54*b* rotatably supported in the common chamber 16*a* as an example of the first liquid chamber and the individual chamber 16*b* as an example of the second liquid chamber. The blades 54*b* are rotated by the flowing force of the liquid.

With this arrangement, the liquid flowing in the common chamber 16*a* is guided to the individual chamber 16*b* by the waterwheel mechanism 54, and is circulated and stirred together with the liquid around the tip portion of the needle valve 17 and the nozzle hole 14. As a result, in a case where a liquid having pseudoplasticity or settleability is used, particle settling or the like is less likely to occur around the tip portion of the needle valve 17 and the nozzle hole 14, and degradation in discharging performance can be reduced.

Figure 11:
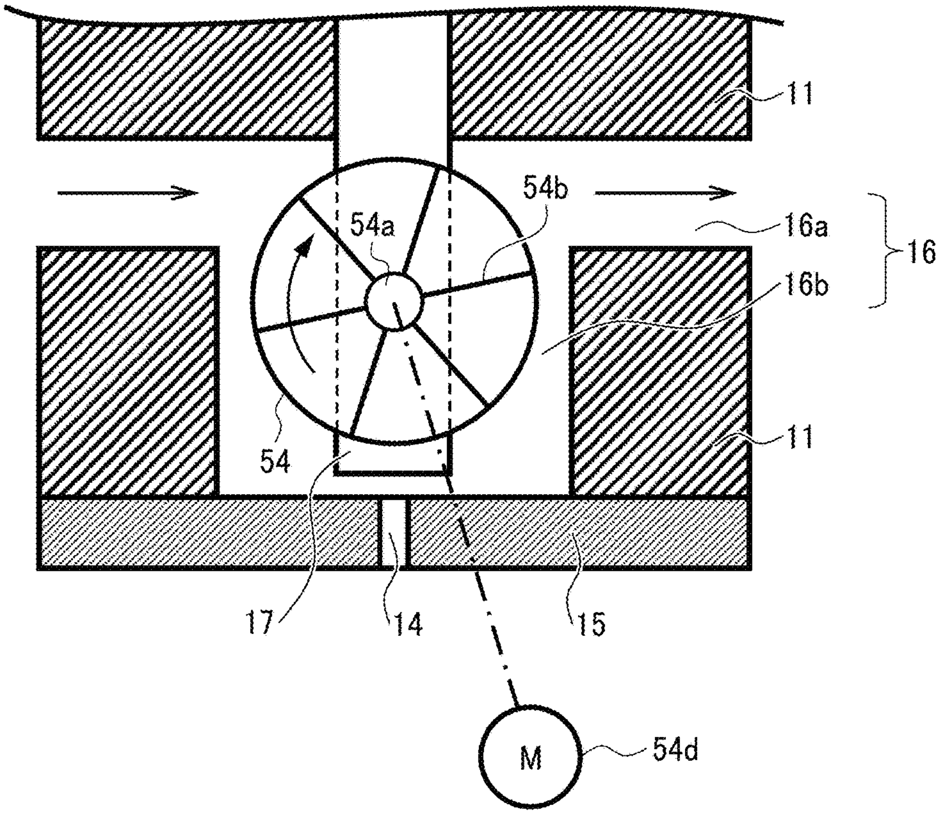
FIG. 11 is an explanatory view illustrating a modification of the third embodiment.

FIG. 11 is an explanatory view illustrating a modification of the third embodiment.

In the configuration illustrated in FIG. 10, the waterwheel mechanism 54 rotates when receiving the liquid flowing in the common chamber 16*a* with the blades 54*b*. However, the waterwheel mechanism 54 may include a drive source 54*d* for rotating the blades 54*b*, as in the present modification. The drive source 54*d* is a drive motor, for example, and the drive source 54*d* and the rotating shaft 54*a* are coupled such that power of the drive source 54*d* is transmitted to the rotating shaft 54*a*. In this case, the rotating shaft 54*a* is rotatably supported by the housing 11 via a bearing at a position facing the needle valve 17, for example, and transmits power from the drive source 54*d* to the blades 54*b*.

As the drive source 54*d* for rotating the blades 54*b* is provided, it becomes possible to continuously stir the liquid in the channel 16 even when the liquid circulation operation is stopped, for example. Thus, particle settling or the like around the tip portion of the needle valve 17 and the nozzle hole 14 can be made less likely to occur.

The present modification can also be applied to a liquid discharge head in which a plurality of liquid discharge modules 30 is disposed as illustrated in FIG. 2, and, in that case, it is possible to achieve the same effects as the effects of the modification of the second embodiment illustrated in FIG. 9.

Liquid Circulation

Next, the configuration of a liquid circulation device that circulates and supplies liquid to the liquid discharge head 10 is described.

Figure 12A:
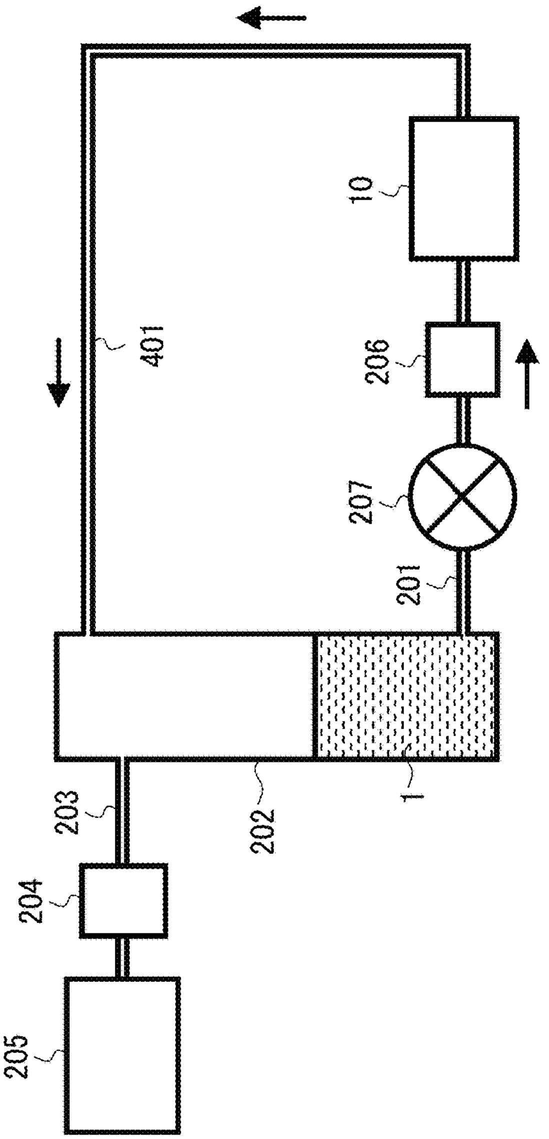
FIGS. 12A and 12B are explanatory diagrams each illustrating an example of a liquid circulation device.
Figure 12B:
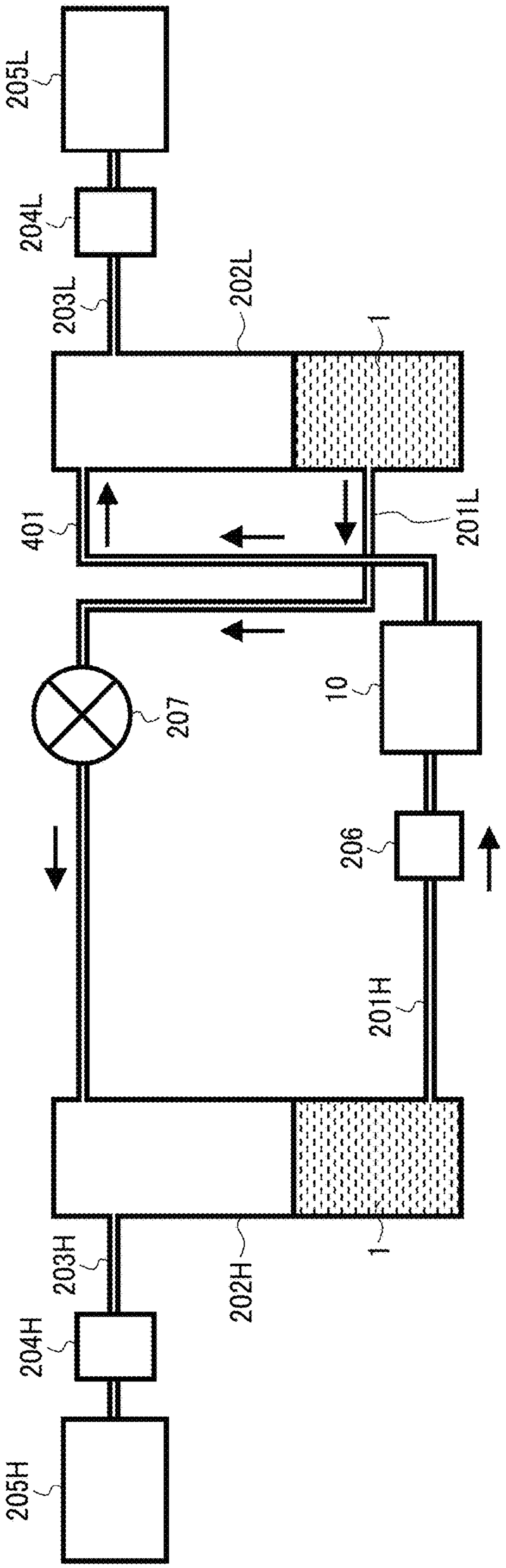

FIGS. 12A and 12B are explanatory views each illustrating an example of a liquid circulation device.

FIG. 12A illustrates a liquid circulation device designed to circulate liquid with pressurized air and a pump. In FIG. 12A, ink 1 to be discharged from the liquid discharge head 10 is stored in a sealed ink tank 202. The ink tank 202 and the liquid discharge head 10 are coupled by an ink supply path 201. In the ink supply path 201, a pump 207 and a filter 206 are arranged in order from the upstream side in the ink supply direction with respect to the liquid discharge head 10. The pump 207 sends the liquid toward the liquid discharge head 10. The filter 206 removes foreign matter from the ink supplied from the pump 207.

Meanwhile, the ink tank 202 is coupled to a compressor 205 via a pressurized air supply path 203 including an air regulator 204. The air regulator 204 adjusts the pressure on a compressed air created by the compressor 205 to a desired air pressure, and supplies the pressurized air from the compressor 205 to the ink tank 202. With this arrangement, the pressurized ink 1 is supplied to the liquid discharge head 10 (the supply port 12 in FIG. 2), and the ink 1 is discharged through the nozzle hole 14 in accordance with opening and closing of the needle valve 17.

An ink ejection path 401 for ejecting ink that has not been discharged through the nozzle hole 14 is coupled to the liquid discharge head 10 (the collection port 13 in FIG. 2). The end of the ink ejection path 401 is coupled to the ink tank 202, and the ink ejected from the liquid discharge head 10 is returned to the ink tank 202 via the ink ejection path 401. With the above configuration, the ink 1 is circulated and supplied to the liquid discharge head 10.

FIG. 12B illustrates a liquid circulation device that includes two ink tanks and circulates liquid using a pressure difference between the two ink tanks. In FIG. 12B, the ink 1 to be discharged from the liquid discharge head 10 is stored in a sealed ink tank 202H. The ink tank 202H and the liquid discharge head 10 are coupled by an ink supply path 201H. In the ink supply path 201H, the filter 206 is disposed on the upstream side of the liquid discharge head 10 in the ink supply direction. The filter 206 removes foreign matter from the ink supplied from the ink tank 202H.

Meanwhile, the ink tank 202H is coupled to a compressor 205H via a pressurized air supply path 203H including an air regulator 204H. The air regulator 204H adjusts the pressure on a compressed air created by the compressor 205H to a desired air pressure, and supplies the pressurized air from the compressor 205H to the ink tank 202H. With this arrangement, the pressurized ink 1 is supplied to the liquid discharge head 10 (the supply port 12 in FIG. 2), and the ink 1 is discharged through the nozzle hole 14 in accordance with opening and closing of the needle valve 17.

An ink ejection path 401 for ejecting ink that has not been discharged through the nozzle hole 14 is coupled to the liquid discharge head 10 (the collection port 13 in FIG. 2). The end of the ink ejection path 401 is coupled to another ink tank 202L, and the ink discharged from the liquid discharge head 10 is ejected to the ink tank 202L via the ink ejection path 401.

Like the ink tank 202H, the ink tank 202L is coupled to a compressor 205L via a pressurized air supply path 203L including an air regulator 204L. The air regulator 204L adjusts the pressure on a compressed air created by the compressor 205L to a desired air pressure, and supplies the pressurized air from the compressor 205L to the ink tank 202L. At this point of time, the pressure on the pressurized air supplied from the air regulator 204L to the ink tank 202L is lower than the pressure on the pressurized air supplied from the air regulator 204H to the ink tank 202H, so that a pressure difference is generated between the ink tanks 202H and 202L.

Thus, the ink 1 sent out from the ink tank 202H flows toward the ink tank 202L.

The ink tank 202L and the ink tank 202H are coupled by an ink supply path 201L. The pump 207 is disposed in the ink supply path 201L, and the pump 207 sends the ink toward the ink tank 202H.

With the above configuration, the ink 1 is circulated and supplied to the liquid discharge head 10. The liquid circulation device in FIG. 12B includes two ink tanks, and therefore, is larger in size. However, since the pump 207 does not exist on the upstream side of the liquid discharge head 10, the pulsation of the pump 207 does not affect the flow of the ink 1, and the flow of the ink to be supplied to the liquid discharge head 10 is stabilized.

In the liquid circulation devices illustrated in FIG. 12A and FIG. 12B, the circulation flow rate of the liquid (ink) with respect to the liquid discharge head 10 may be changed with the type of the liquid.

In the configuration illustrated in FIG. 12A, the amount of the liquid to be sent out by the pump 207 is changed to control the circulation flow rate. In the configuration illustrated in FIG. 12B, the differential pressure amount between the high pressure side (the ink tank 202H) and the low pressure side (the ink tank 202L) is changed so that the circulation flow rate is controlled. Next, an example of a table to be used in controlling the circulation flow rate is described.

Circulation Flow Rate Information Management Table

FIG. 13 is a conceptual diagram illustrating an example of a circulation flow rate information management table.

The circulation flow rate information management table is formed in a storage unit 902 described later. The circulation flow rate information management table manages conditions for maintaining a stable discharge state without settling of an ink composition in the channel 16 in the liquid discharge head 10. For example, the correspondence relationship among the particle density; the particle concentration, and the circulation flow rate is assigned to the circulation flow rate information management table. For example, when the particle density of the ink to be used is 0 to 2 g/cm$^3$, and the particle density is 25 to 50 wt %, the circulation flow rate is set to 40 ml/min, according to the table.

The value of the circulation flow rate may be calculated by a controller based on the values of a particle density and a particle concentration input from a terminal device by the user. Alternatively, the user may acquire information about the particle density and the particle concentration from the ink specification or the like, and directly designate the value of the circulation flow rate from the information.

Configuration of a Control System

Next, a control system relating to the head unit 60, the pump 207, and the air regulator 204 is described with reference to FIGS. 14 and 15.

Figure 14:
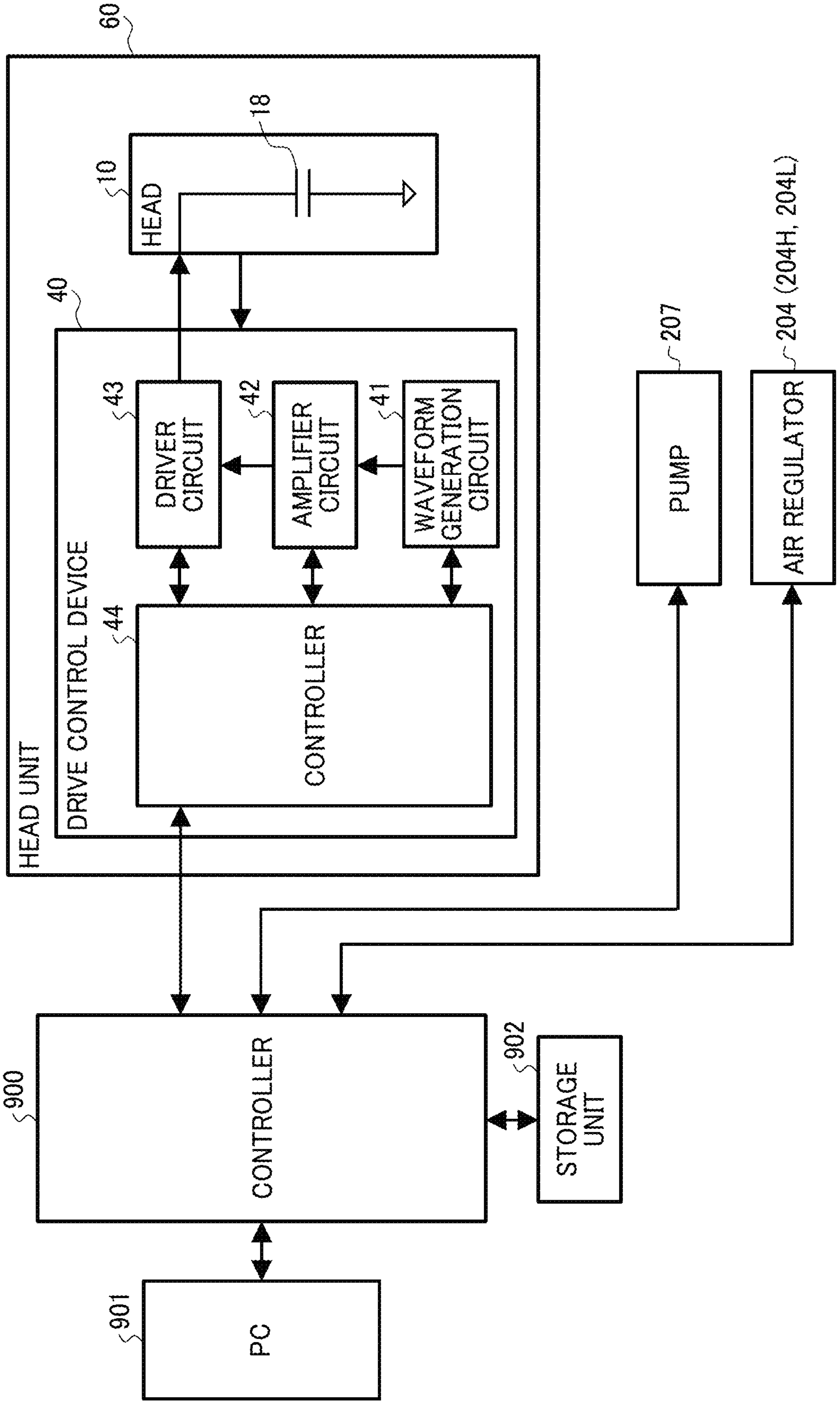
FIG. 14 is a block diagram illustrating an example of a control system of a head unit, a pump, and an air regulator.
Figure 15:
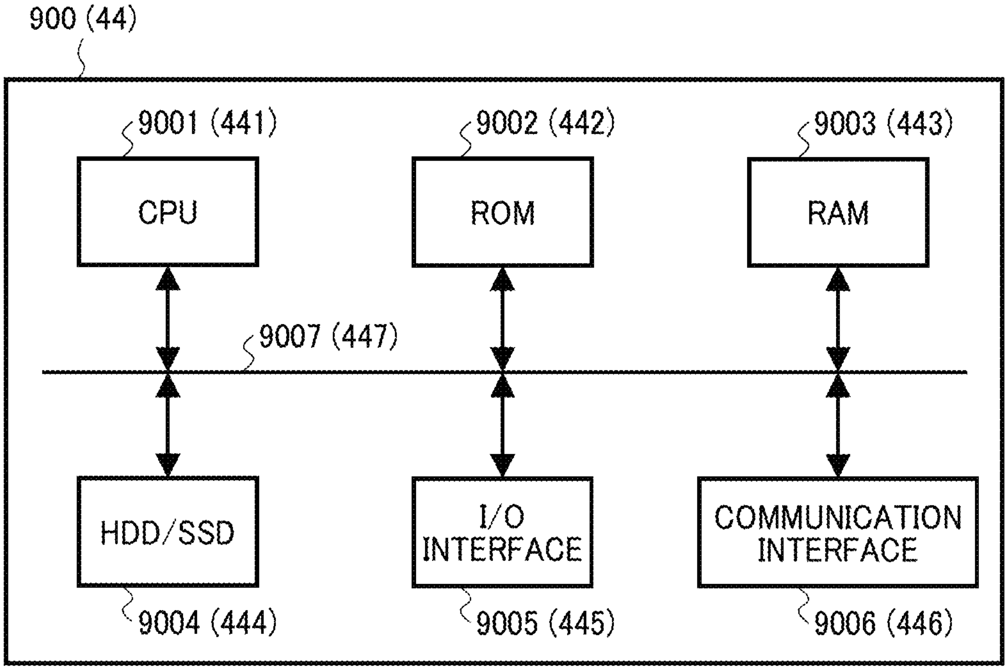
FIG. 15 is an explanatory diagram illustrating an example of the hardware configuration of a controller.

FIG. 14 is a block diagram illustrating an example of a control system of a head unit, a pump, and an air regulator. FIG. 15 is an explanatory diagram illustrating an example of the hardware configuration of a controller.

The head unit 60, the pump 207, and the air regulator 204 (204H, 204L) are electrically coupled to a controller 900. The controller 900 may control the overall operation of the liquid discharge apparatus described later, and components may be added as necessary to the components illustrated in FIG. 14. The controller 900 transmits a discharge cycle signal for discharging ink based on image data, to the controller 44 of the drive control device 40, for example. The controller 900 receives information and the like regarding the operation state of the liquid discharge head 10 via the drive control device 40. The controller 900 transmits an instruction signal for instructing the pump 207 on the circulation flow rate of the liquid. The controller 900 further transmits a switching signal for switching the amount of supply of pressurized air, to the air regulator 204.

The head unit 60 includes the liquid discharge head 10 and the drive control device 40. The drive control device 40 includes the waveform generation circuit 41, the amplifier circuit 42, the driver circuit 43, and the controller 44. The waveform generation circuit 41 generates a drive pulse waveform. The amplifier circuit 42 amplifies the voltage value of the drive pulse waveform generated by the waveform generation circuit 41 to a desired value. The driver circuit 43 applies the voltage amplified by the amplifier circuit 42 to the piezoelectric element 18. The controller 44 receives, from the controller 900, the discharge cycle signal for discharging ink based on image data, for example. The controller 44 also transmits and receives information for ink discharge to and from the waveform generation circuit 41, the amplifier circuit 42, and the driver circuit 43, based on the discharge cycle signal received from the controller 900.

These functions are implemented by an electric circuit, and some of these functions can be implemented by software (a central processing unit: CPU).

Alternatively, these functions may be implemented by a plurality of circuits or a plurality of pieces of software.

The storage unit 902 stores information about the open voltage of the needle valve 17, information about the discharge rate and the discharge amount of ink, and the like. The above-described circulation flow rate information management table (information about particle density, particle concentration, and circulation flow rate) is also formed in the storage unit 902.

The controller 900 stores various kinds of data into the storage unit 902, and reads various kinds of data from the storage unit 902. The storage unit 902 may be provided in the controller 900.

A terminal device 901 such as a personal computer (PC) is coupled to the controller 900. The terminal device 901 receives an instruction input by the user through an input device such as a keyboard, a mouse, or a touch panel, and transmits a signal corresponding to the received instruction to the controller 900. The terminal device 901 also receives various kinds of signals indicating the operating state of the head unit 60, the operating state of the pump 207, the operating state of the air regulator 204, and the like from the controller 900, and displays information corresponding to the received signals on an output device such as a display or a touch panel.

As described above, the drive control device 40 generates a drive voltage (a drive waveform) based on the discharge cycle signal received from the controller 900, and drives the liquid discharge head 10 using the generated drive voltage. The liquid discharge head 10 opens and closes the nozzle holes 14 in accordance with the drive voltage from the drive control device 40, to discharge ink.

In accordance with an instruction signal received from the controller 900, the pump 207 changes the output of the pump 207, for example, to control the ink circulation flow rate.

In accordance with a switching signal received from the controller 900, the air regulator 204 (204H, 204L) changes the output of the air regulator 204, for example, to control the pressure in the ink tank 202 (202H, 202L).

Next, the hardware configuration of the controller 900 and the controller 44 of the drive control device 40 is described with reference to FIG. 15. In the hardware configuration illustrated in FIG. 15, components may be added or deleted as necessary.

The controller 900 (44) includes a central processing unit (CPU) 9001 (441), a read only memory (ROM) 9002 (442), a random access memory (RAM) 9003 (443), a hard disk drive (HDD)/solid state drive (SSD) 9004 (444), an input/output (I/O) interface 9005 (445), a communication interface 9006 (446), and a bus line 9007 (447). Since the controller 900 and the controller 44 have the same configuration, the following description is based on the configuration of the controller 900. The controller 900 and CPU 9001 may be implemented by one or more processing circuits or circuitry.

The CPU 9001 is an arithmetic device that implements each function of a target device or a target unit by reading a program or data stored in the ROM 9002 into the RAM 9003 and performing processing.

The ROM 9002 is a nonvolatile memory that can hold programs or data even when the power is turned off. The RAM 9003 is a volatile memory that is used as a work area or the like of the CPU 9001. The HDD/SSD 9004 controls reading or writing of various kinds of data, under the control of the CPU 9001. The functions of the storage unit 902 described above may be implemented by the HDD/SSD 9004.

The I/O interface 9005 is an interface for inputting/outputting to/from devices such as the head unit 60, the pump 207, and the air regulator 204.

The communication interface 9006 is an interface that conducts communication (connection) with a device that performs data processing, such as the terminal device 901, via a communication network.

The bus line 9007 is an address bus, a data bus, or the like for electrically coupling the above components, and transmits an address signal, a data signal, various control signals, and the like. The CPU 9001, the ROM 9002, the RAM 9003, the HDD/SSD 9004, the I/O interface 9005, and the communication interface 9006 are coupled to one another via the bus line 9007.

Liquid Discharge Apparatus

In the description below; a liquid discharge apparatus to which the liquid discharge head described above is applied is explained.

Figure 16:
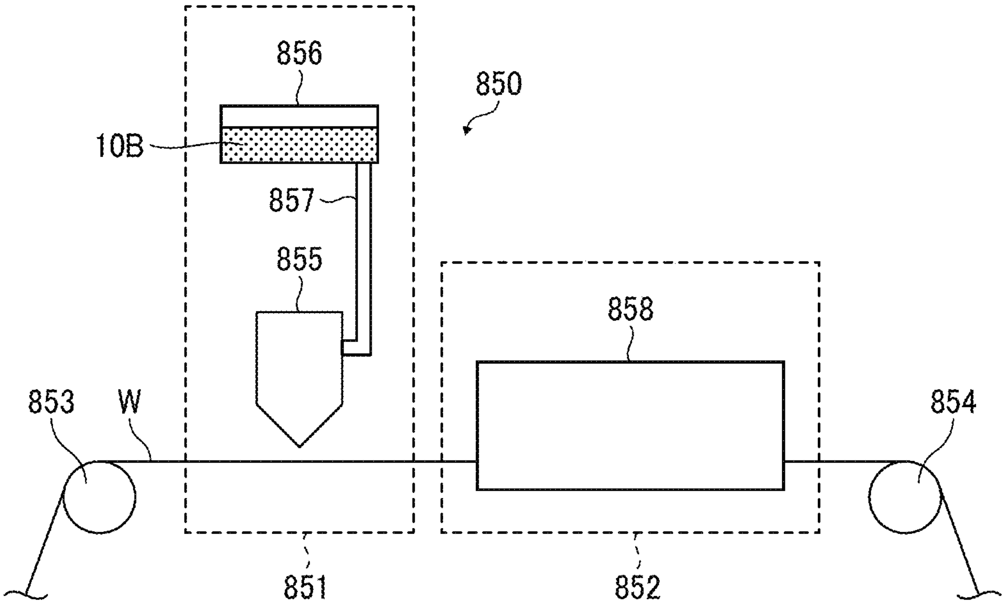
FIG. 16 is an explanatory diagram illustrating an example of an electrode manufacturing apparatus.

As an example of the liquid discharge apparatus, an example application to an electrode manufacturing apparatus is described with reference to FIG. 16. FIG. 16 is an explanatory diagram illustrating an example of an electrode manufacturing apparatus.

An electrode manufacturing apparatus 850) is an apparatus that discharges a liquid composition using the above liquid discharge head 10, to manufacture an electrode having a layer containing an electrode material.

As the liquid composition is discharged from the liquid discharge head 10, the liquid composition can be applied onto the object to form a liquid composition layer. The object in this case is not limited to any particular object, as long as a layer containing an electrode material is to be formed on the object. The object can be selected as appropriate in accordance with the purpose of use, and examples thereof include an electrode substrate (a current collector), an active material layer, and a layer containing a solid electrode material. Further, the application of the liquid composition to the object may be formation of a layer containing an electrode material by directly discharging the liquid composition, or formation of a layer containing an electrode material by indirectly discharging the liquid composition, as long as the layer containing the electrode material can be formed on the object.

Other components in the electrode manufacturing apparatus can be selected as appropriate in accordance with the purpose, and examples thereof include a heating unit. The heating unit heats the liquid composition discharged by the liquid discharge head 10. The liquid composition layer can be dried by the heating.

FIG. 16 illustrates a configuration in which an electrode mixture layer containing an active material is formed on an electrode substrate (a current collector), as an example of the electrode manufacturing apparatus.

The electrode manufacturing apparatus 850 includes a discharge process unit 851 including a process of applying a liquid composition onto a print base material W including the object to form a liquid composition layer, and a heating process unit 852 including a process of heating the liquid composition layer to obtain an electrode mixture layer.

The electrode manufacturing apparatus 850 includes conveyance units 853 and 854 that convey the print base material W, and the conveyance units 853 and 854 convey the print base material W in order of the discharge process unit 851 and the heating process unit 852 at a preset speed. The method for manufacturing the print base material W including the object such as an active material layer is not limited to any particular method, and a known method can be selected as appropriate.

The discharge process unit 851 includes a printing device 855 that carries out a process of applying a liquid composition onto the print base material W, a storage container 856 that stores the liquid composition, and a supply tube 857 that supplies the liquid composition stored in the storage container 856 to the printing device 855. The printing device 855 includes at least one of the liquid discharge heads 10 described above.

The storage container 856 stores a liquid composition 10B, and the discharge process unit 851 discharges the liquid composition 10B from the liquid discharge head 10 provided in the printing device 855, and applies the liquid composition 10B onto the print base material W to form a liquid composition layer in a thin film form. The storage container 856 may be integrated with the electrode manufacturing apparatus 850, but may be detachable from the electrode manufacturing apparatus 850. Alternatively, a container may be used for adding to the storage container 856 integrated with the electrode manufacturing apparatus 850, or the storage container 856 detachable from the electrode manufacturing apparatus 850. The storage container 856 and the supply tube 857 that can stably store and supply the liquid composition 10B can be selected as appropriate.

The heating process unit 852 includes a heating device 858, and has a solvent removal process of heating and drying the solvent remaining on the liquid composition layer with the heating device 858, to remove the solvent. Thus, an electrode mixture layer can be formed. The heating process unit 852 may perform the solvent removal process under reduced pressure.

The heating device 858 is not limited to any particular device, and can be selected as appropriate in accordance with the purpose. Examples of such heating devices include a substrate heater, an infrared (IR) heater, and a hot air heater, and these heaters may be combined. The heating temperature and time can also be selected as appropriate in accordance with the boiling point of the solvent contained in the liquid composition 10B and the thickness of the film to be formed.

The electrode mixture layer formed as described above can be suitably used as a component in an electrochemical element, for example. The components other than the electrode mixture layer in the electrochemical element are not limited to any particular components, and known components such as a positive electrode, a negative, electrode, and a separator can be selected as appropriate, for example.

Supplementary Notes

In the present embodiment, a "liquid discharge apparatus" is an apparatus that includes a liquid discharge head and drives the liquid discharge head to discharge liquid. The term "liquid discharge apparatus" used here includes, in addition to apparatuses to discharge liquid to materials to which liquid can adhere, apparatuses to discharge the liquid into gas (air) or liquid.

The "liquid discharge apparatus" may include devices to feed, convey, and eject the material to which liquid can adhere. The liquid discharge apparatus may further include a pretreatment apparatus and a post-treatment apparatus. The "liquid discharge apparatus" may be, for example, an image forming apparatus to form an image on a paper sheet by discharging ink, or a three-dimensional fabrication apparatus to discharge a fabrication liquid to a powder layer in which a powder material is formed in layers to form a three-dimensional fabrication object.

The term "liquid discharge apparatus" is not limited to an apparatus to discharge liquid to visualize meaningful images, such as letters or figures. For example, the liquid discharge apparatus may be an apparatus to form meaningless images, such as meaningless patterns, or fabricate three-dimensional images.

The above term "material to which liquid can adhere" means a material to which liquid at least temporarily adheres, a material to which liquid adheres and is fixed, or a material into which liquid adheres and permeates. Examples of the "material to which liquid can adhere" include recording media such as a paper sheet, recording paper, a recording sheet of paper, film, and cloth, electronic components such as an electronic substrate and a piezoelectric element, and media such as a powder layer, an organ model, and a testing cell. The "material to which liquid can adhere" includes any material to which liquid can adhere, unless particularly limited.

The above "material to which liquid can adhere" may be any material to which liquid can adhere even temporarily, such as paper, thread, fiber, cloth, leather, metal, plastic, glass, wood, ceramics, a current collector like aluminum foil or copper foil, or an electrode in which an active material layer is formed on a current collector.

Further, the term "liquid" includes any liquid that has viscosity or surface tension, and is dischargeable from the head. However, the viscosity of the liquid is preferably not higher than 30 mPa's under ordinary temperature and ordinary pressure, or by heating or cooling. More specifically; examples of the liquid include solutions, suspensions, and emulsions containing a solvent such as water or an organic solvent, a colorant such as a dye and a pigment, a function-imparting material such as a polymerizable compound, a resin, or a surfactant, a biocompatible material such as deoxyribonucleic acid (DNA), an amino acid, a protein, and calcium, an edible material such as a natural pigment, an active material or a solid electrolyte to be used as an electrode material, an ink containing a conductive material or an insulating material, or the like. Such a solution, a suspension, or an emulsion can be used for an inkjet ink, a surface treatment solution, a liquid for forming components of an electronic element or a light-emitting element or a resist pattern of an electronic circuit, a material solution for three-dimensional fabrication, an electrode, an electrochemical element, or the like.

The "liquid discharge apparatus" may be an apparatus to relatively move a liquid discharge head and a material to which liquid can adhere. However, the liquid discharge apparatus is not necessarily such an apparatus. For example, the liquid discharge apparatus may be a serial head apparatus that moves the liquid discharge head, a line head apparatus that does not move the liquid discharge head, or the like.

Examples of the "liquid discharge apparatus" further include: a treatment liquid applying apparatus that discharges a treatment liquid onto a paper sheet to apply the treatment liquid to the surface of the paper sheet, in order to reform the surface of the paper sheet; and an injection granulation apparatus that injects, through nozzle holes, a composition liquid in which a raw material is dispersed in a solution, to granulate fine particles of the raw material.

The "liquid discharge apparatus" is not necessarily a stationary apparatus. The liquid discharge apparatus may be, for example, a robot on which a liquid discharge head is mounted and which can be moved by remote control or autonomous traveling, and the liquid discharge apparatus can also be used for painting of outer walls of a building, painting of a road marking (such as a crosswalk, a stop line, or a speed display), or the like with a movable robot. A building and a road in this case are also included in the "material to which liquid can adhere".

The above description is an example, and the present embodiment has unique effects for each of the following aspects.

Each of the functions of the described embodiments such as the drive control device 40 may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

First Aspect

A first aspect is a liquid discharge head (for example, the liquid discharge head 10) that includes: a channel (for example, the channel 16) through which a liquid passes: a nozzle hole (for example, the nozzle hole 14) that communicates with the channel and discharges the liquid: a needle valve (for example, the needle valve 17) that moves away from and comes into contact with the nozzle hole to open and close the nozzle hole; and a driver (for example, the piezoelectric element 18) that moves the needle valve away from and toward the nozzle hole. The liquid discharge head further including a guide (for example, the directional member 50, 51, or 52, the channels 16*c* and 16*d*, the propeller mechanism 53, or the waterwheel mechanism 54) that guides the liquid passing through the channel toward the nozzle hole.

Second Aspect

According to a second aspect, in the first aspect, the channel (for example, the channel 16) includes a first liquid chamber (for example, the common chamber 16*a*) through which the liquid passes and a second liquid chamber (for example, the individual chamber 16*b*) formed between the first liquid chamber and the nozzle hole, and the guide (for example, the directional member 50, 51, or 52, the propeller mechanism 53, or the waterwheel mechanism 54) guides the liquid from the first liquid chamber toward the second liquid chamber.

Third Aspect

According to a third aspect, in the second aspect, the guide (for example, the directional member 50, 51, or 52) is a directional member that is formed with a plate-like member such as a plate secured to the first liquid chamber (for example, the common chamber 16*a*).

Fourth Aspect

According to a fourth aspect, in the third aspect, the directional member (for example, the directional member 51 or 52) includes: a guide portion (for example, the guide portion 51*a* or 52*a*) that guides the liquid toward the second liquid chamber (for example, the individual chamber 16*b*); and a bypass portion (for example, both end portions of the guide portion 51*a*, or the opening 52*b*) that guides the liquid to the downstream side of the first liquid chamber (for example, the common chamber 16*a*).

Fifth Aspect

According to a fifth aspect, in the first aspect, the guide (for example, the channels 16*c* and 16*d*) is a channel formed in a shape for guiding the liquid toward the nozzle hole and then guiding the liquid in a direction away from the nozzle hole.

Sixth Aspect

According to a sixth aspect, in the second aspect, the guide (for example, the propeller mechanism 53 or the waterwheel mechanism 54) includes a rotator (for example, the blades 53*b* or the blades 54*b*) rotatably supported in the first liquid chamber and the second liquid chamber.

Seventh Aspect

According to a seventh aspect, in the sixth aspect, the rotator (for example, the blades 53*b* or the blades 54*b*) is rotated by a flowing force of the liquid.

Eighth Aspect

According to an eighth aspect, in the sixth aspect, the guide (for example, the propeller mechanism 53 or the waterwheel mechanism 54) includes a drive source (for example, the drive source 53*d* or the drive source 54*d*) that rotates the rotator (for example, the blades 53*b* or the blades 54*b*).

Ninth Aspect

A ninth aspect is a liquid discharge apparatus including the liquid discharge head of any one of the first to eighth aspects.

Tenth Aspect

According to a tenth aspect, the liquid discharge apparatus of the ninth aspect further includes a control unit (for example, the controller 900) that changes the flow rate of liquid for the liquid discharge head, depending on the type of the liquid.

Eleventh Aspect

According to an eleventh aspect, the liquid discharge apparatus of the ninth aspect further includes a filter (for example, the filter 206) that removes foreign matter from the liquid, the filter being located at an upstream portion in a liquid supply direction with respect to the liquid discharge head.

[Aspect 1]

A liquid discharge head (10) includes: a nozzle hole (14) from which a liquid is dischargeable in a discharge direction: a channel (16) communicating with the nozzle hole (14) to supply the liquid to the nozzle hole (14): a needle valve (17) movable in the discharge direction to openably close the nozzle hole (14): a driver (18) to move the needle valve (17) in the discharge direction; and a guide (50, 51, 52, 16*c*, 16*d*, 53, 54) to guide the liquid in the channel (16) toward the nozzle hole (14).

[Aspect 2]

The liquid discharge head (10) of aspect 1, further includes: multiple nozzle holes (14) including the nozzle hole (14); and multiple guides (50, 51, 52, 16*c*, 16*d*, 53, 54) including the guide (50, 51, 52, 16', 53, 54). The channel (16) includes: multiple individual chambers (16*b*) to respectively supply the liquid to the multiple nozzle holes (14); and a common chamber (16*a*) communicating with each of the multiple individual chambers (16*b*), and the multiple guides (50, 51, 52, 16*c*, 16*d*, 53, 54) respectively guide the liquid from the common chamber (16*a*) toward the multiple individual chambers (16*b*).

[Aspect 3]

In the liquid discharge head (10) of aspect 2, the multiple guides (50, 51, 52, 16*c*, 16*d*, 53, 54) respectively have plates (50, 51, 52) secured to the multiple individual chambers (16*b*), respectively.

[Aspect 4]

In the liquid discharge head (10) of aspect 3, each of the multiple guides (51, 52) includes: a guide portion (51*a*, 52*a*) to guide the liquid toward the one of the multiple individual chambers (16*b*); and a bypass portion (52*b*) to guide the liquid to the common chamber (16*a*) communicating with another of the multiple individual chambers (16*b*).

[Aspect 5]

In the liquid discharge head (10) of aspect 1, the guide (16*c* and 16*d*) has: another channel inclined to guide the liquid toward the nozzle hole (14); and further another channel inclined to guide the liquid away from the nozzle hole (14).

[Aspect 6]

In the liquid discharge head (10) of aspect 1, the guide (50, 51, 52, 16*c*, 16*d*, 53, 54) includes a rotator (53, 54) rotatably attached to the needle valve (17) in the channel.

[Aspect 7]

In the liquid discharge head (10) of aspect 6, the rotator is rotatable by the liquid flowing through the channel.

[Aspect 8]

In the liquid discharge head (10) of aspect 6, the guide (50, 51, 52, 16*c*, 16*d*, 53, 54) includes a drive source to rotate the rotator (53, 54).

[Aspect 9]

A liquid discharge apparatus (850) includes: the liquid discharge head (10) of any one of aspects 1 to 8; and circuitry (40) coupled to the driver (18) of the liquid discharge head (10) to control movement of the needle valve (17).

[Aspect 10]

In the liquid discharge apparatus (850) of aspect 9, the circuitry (900) changes a flow rate of a liquid supplied to the liquid discharge head (10) according to a type of the liquid.

[Aspect 11]

The liquid discharge apparatus (850) of aspect 9, further includes: a filter (206) on an upstream from the liquid discharge head (10) in a liquid supply direction of the liquid supplied to the liquid discharge head (10), the filter (206) to remove foreign matter from the liquid.

Numerous additional modifications and variations are possible in light of the above teachings. It is therefore to be understood that, within the scope of the above teachings, the present disclosure may be practiced otherwise than as specifically described herein. With some embodiments having thus been described, it is obvious that the same may be varied in many ways. Such variations are not to be regarded as a departure from the scope of the present disclosure and appended claims, and all such modifications are intended to be included within the scope of the present disclosure and appended claims.

The invention claimed is:

1. A liquid discharge head comprising:

a nozzle hole from which a liquid is dischargeable in a discharge direction;

a channel communicating with the nozzle hole to supply the liquid to the nozzle hole;

a needle valve movable in the discharge direction to open or close the nozzle hole;

a driver to move the needle valve in the discharge direction;

a guide to guide the liquid in the channel toward the nozzle hole; and multiple nozzle holes including the nozzle hole; and multiple guides including the guide, wherein the channel includes:

multiple individual chambers to respectively supply the liquid to the multiple nozzle holes; and a common chamber communicating with each of the multiple individual chambers, and the multiple guides respectively guide the liquid from the common chamber toward the multiple individual chambers, and wherein the multiple guides respectively have plates secured to the multiple individual chambers, respectively, wherein each of the multiple guides includes:

a guide portion including a plate to guide the liquid toward the corresponding multiple individual chambers; and a bypass portion to guide the liquid to the common chamber communicating with another of the multiple individual chambers, the bypass portion includes multiple openings that penetrate through the plate of the guide portion.

2. The liquid discharge head of claim 1, wherein the guide includes:

another channel inclined to guide the liquid toward the nozzle hole; and a further another channel inclined to guide the liquid away from the nozzle hole.

3. The liquid discharge head of claim 1, wherein:

the guide includes a rotator rotatably attached to the needle valve in the channel.

4. The liquid discharge head of claim 3, wherein;

the rotator is rotatable by the liquid flowing through the channel.

5. The liquid discharge head of claim 3, wherein:

the guide includes a drive source to rotate the rotator.

6. A liquid discharge apparatus comprising:

the liquid discharge head according to claim 1; and circuitry coupled to the driver of the liquid discharge head to control movement of the needle valve.

7. The liquid discharge apparatus of claim 6, wherein:

the circuitry changes a flow rate of a liquid supplied to the liquid discharge head according to a type of the liquid.

8. The liquid discharge apparatus of claim 6, further comprising:

a filter on an upstream side of the liquid discharge head in a liquid supply direction of the liquid supplied to the liquid discharge head, the filter to remove foreign matter from the liquid.

9. The liquid discharge head of claim 1, wherein:

wherein the multiple guides include have different size openings of the bypass portion.

10. The liquid discharge head of claim 1, wherein:

the needle valve and the driver are coupled via a holder, the holder having a tip portion coupled to the needle valve and a rear end portion secured by a regulator attached to a housing.

11. The liquid discharge head of claim 1, further comprising:

a seal disposed in the housing between the needle valve and a bearing portion.

12. The liquid discharge head of claim 1, wherein:

the liquid is a settleable liquid including particles having a viscosity that settle in the channel when discharge is stopped.

13. The liquid discharge head of claim 3, wherein:

the rotator is a propeller mechanism including a cylindrical sleeve and blades on an outer circumferential portion of the sleeve.

14. The liquid discharge head of claim 3, wherein:

the rotator is a waterwheel mechanism including a rotating shaft and blades extending in a radial direction from an outer circumferential portion of the rotating shaft.

15. The liquid discharge head of claim 13, wherein:

the cylindrical sleeve is rotatably supported on an outer periphery of a tip portion of the needle valve.

16. The liquid discharge apparatus of claim 6, wherein:

the circuitry includes a waveform generation circuit configured to generate a drive pulse waveform to be applied to the driver.

17. The liquid discharge apparatus of claim 16, wherein the circuitry further includes:

an amplifier circuit configured to amplify a voltage value of the drive pulse waveform, and a driver circuit configured to apply the amplified voltage to the driver.

18. The liquid discharge apparatus of claim 6, further comprising:

a pump coupled to the circuitry and configured to send the liquid toward the liquid discharge head.

19. The liquid discharge apparatus of claim 18, wherein:

the circuitry transmits an instruction signal for instructing the pump on a circulation flow rate of the liquid.

20. The liquid discharge apparatus of claim 7, wherein:

the circuitry controls the circulation flow rate of the liquid based on at least one of particle density and particle concentration of the liquid.

* * * * *